United States Patent
Hulbert et al.

(10) Patent No.: US 11,695,864 B2
(45) Date of Patent: *Jul. 4, 2023

(54) DYNAMIC USER INTERFACE SCHEMES FOR AN ELECTRONIC DEVICE BASED ON DETECTED ACCESSORY DEVICES

(71) Applicant: Apple Inc., Cupertino, CA (US)

(72) Inventors: Thomas S. Hulbert, Palo Alto, CA (US); Jeremy D. Bataillou, San Francisco, CA (US); Gemma A. Roper, San Francisco, CA (US); Brian T. Gleeson, Mountain View, CA (US); Miao He, Sunnyvale, CA (US); Benjamin G. Jackson, Belmont, CA (US); David C. Burns, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,902

(22) Filed: Jan. 25, 2022

(65) Prior Publication Data

US 2022/0150347 A1 May 12, 2022

Related U.S. Application Data

(63) Continuation of application No. 17/033,641, filed on Sep. 25, 2020, now Pat. No. 11,240,365.

(51) Int. Cl.
*H04M 1/72412* (2021.01)
*H04B 1/3888* (2015.01)
(Continued)

(52) U.S. Cl.
CPC .... *H04M 1/72412* (2021.01); *G06F 3/04817* (2013.01); *G06F 3/04847* (2013.01);
(Continued)

(58) Field of Classification Search
CPC ............ H04M 1/72412; H04B 1/3888
(Continued)

(56) References Cited

U.S. PATENT DOCUMENTS

| 6,104,808 A | 8/2000 | Alameh et al. |
| 8,358,513 B2 | 1/2013 | Kim |

(Continued)

FOREIGN PATENT DOCUMENTS

| CN | 108933852 | 12/2018 |
| EP | 2977880 | 1/2016 |

(Continued)

OTHER PUBLICATIONS

U.S. Appl. No. 17/033,627, filed Sep. 25, 2020, Hulbert et al.
(Continued)

*Primary Examiner* — David Bilodeau
(74) *Attorney, Agent, or Firm* — Brownstein Hyatt Farber Schreck, LLP

(57) ABSTRACT

A system may include an electronic device that includes an enclosure having a transparent cover. The electronic device may also include a display positioned below the transparent cover and configured to display a first graphical user interface and a second graphical user interface different from the first graphical user interface, and a touch sensor positioned below the transparent cover and configured to detect touch inputs applied to the transparent cover. The system may also include a protective case that includes a shell defining a cavity and configured to at least partially cover the enclosure of the electronic device when the electronic device is positioned in the cavity, and a near-field wireless communication antenna coupled to the shell and detectable by the electronic device. In response to detecting the near-field wireless communication antenna, the electronic device may be con-
(Continued)

figured to switch from the first graphical user interface to the second graphical user interface.

20 Claims, 16 Drawing Sheets

(51) Int. Cl.
| | |
|---|---|
| *H04M 1/72448* | (2021.01) |
| *H04B 5/00* | (2006.01) |
| *H04N 23/63* | (2023.01) |
| *G06F 3/04817* | (2022.01) |
| *G06F 3/04847* | (2022.01) |
| *G06F 3/16* | (2006.01) |

(52) U.S. Cl.
CPC ........... *G06F 3/165* (2013.01); *H04B 1/3888* (2013.01); *H04B 5/0025* (2013.01); *H04M 1/72448* (2021.01); *H04N 23/631* (2023.01)

(58) Field of Classification Search
USPC ........................................................ 455/566
See application file for complete search history.

(56) References Cited

U.S. PATENT DOCUMENTS

| | | | |
|---|---|---|---|
| 8,432,262 | B2 | 4/2013 | Talty |
| 8,838,024 | B2 | 9/2014 | Iwasaki et al. |
| 8,949,734 | B2 | 2/2015 | Stallings et al. |
| 8,964,364 | B2 | 2/2015 | Abdelsamie et al. |
| 9,065,932 | B2 | 6/2015 | Abdelsamie et al. |
| 9,167,375 | B2 | 10/2015 | Geris et al. |
| 9,389,638 | B2 | 7/2016 | Abdelsamie et al. |
| 9,389,641 | B2 | 7/2016 | Jayetileke et al. |
| 9,405,319 | B2 | 8/2016 | Salo et al. |
| 9,471,270 | B2 | 10/2016 | Lee et al. |
| 9,923,587 | B2 | 3/2018 | Aldana et al. |
| 9,973,620 | B2 | 5/2018 | Baek et al. |
| 10,630,826 | B2 | 4/2020 | Ishida et al. |
| 10,838,462 | B1 | 11/2020 | Monaco |
| 2003/0046401 | A1 | 3/2003 | Abbott et al. |
| 2008/0253079 | A1 | 10/2008 | Robinson et al. |
| 2011/0192857 | A1 | 8/2011 | Rothbaum et al. |
| 2013/0304959 | A1 | 11/2013 | Chiang et al. |
| 2014/0075075 | A1 | 3/2014 | Morrill et al. |
| 2014/0256250 | A1 | 9/2014 | Cueto et al. |
| 2015/0156297 | A1 | 6/2015 | Crawford et al. |
| 2015/0172431 | A1 | 6/2015 | Huang et al. |
| 2018/0176748 | A1 | 6/2018 | Kim et al. |
| 2022/0103675 | A1 | 3/2022 | Hulbert et al. |
| 2022/0116494 | A1 | 4/2022 | Chang et al. |

FOREIGN PATENT DOCUMENTS

| | | |
|---|---|---|
| KR | 200463713 | 11/2012 |
| WO | WO 15/047363 | 4/2015 |

OTHER PUBLICATIONS

U.S. Appl. No. 17/033,641, filed Sep. 25, 2020, Hulbert et al.
U.S. Appl. No. 17/498,562, filed Oct. 11, 2021, Chang et al.
Anonymous, "What's New in Apple's iPad Pro 11-inch tablet? full review!", Apr. 24, 2020, https://techmate-tips.com/whats-new-and-improved-in-new-apple-ipad-pro-tablet-full-review, 8 pages.
The Verge, "Amazon's dock makes the Fire table a Better Echo Show," https://www.theverge.com/2018/7/12/17555248/amazon-show-mode-charging-dock-fire-tablet-review-specs-price, Jul. 12, 2018, 7 pages.

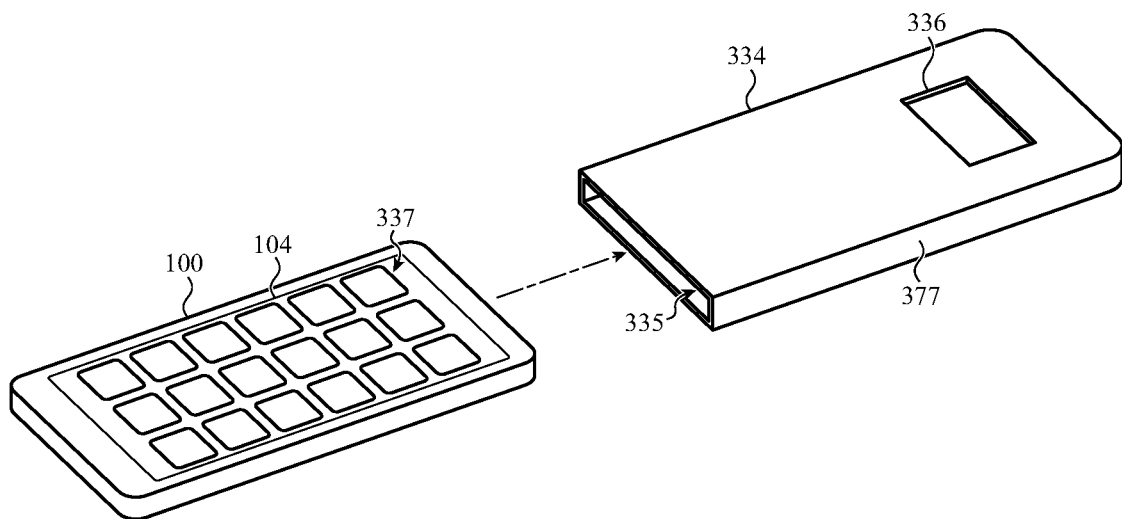
*FIG. 3D*
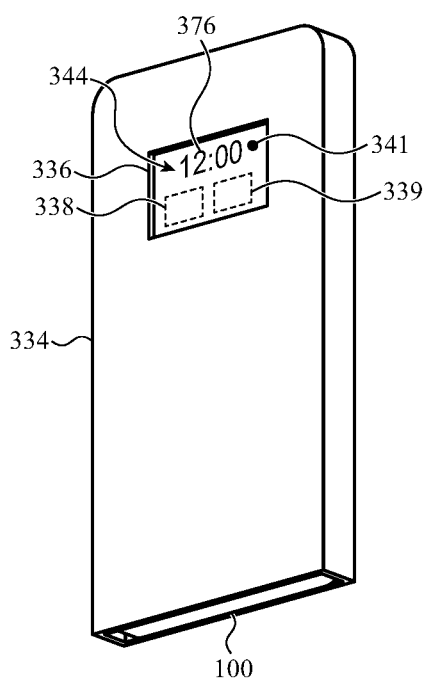
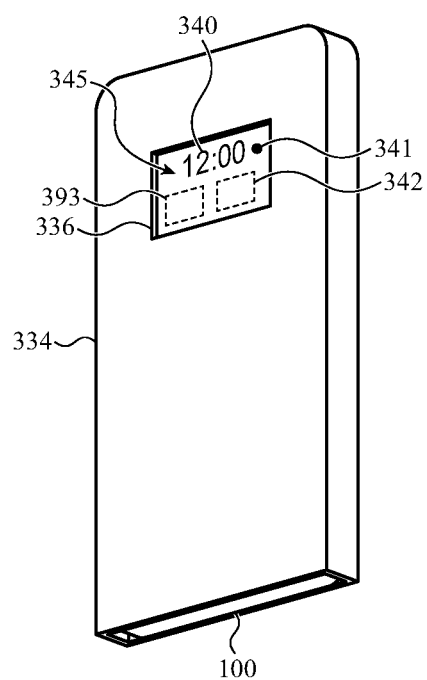
*FIG. 3E*   *FIG. 3F*

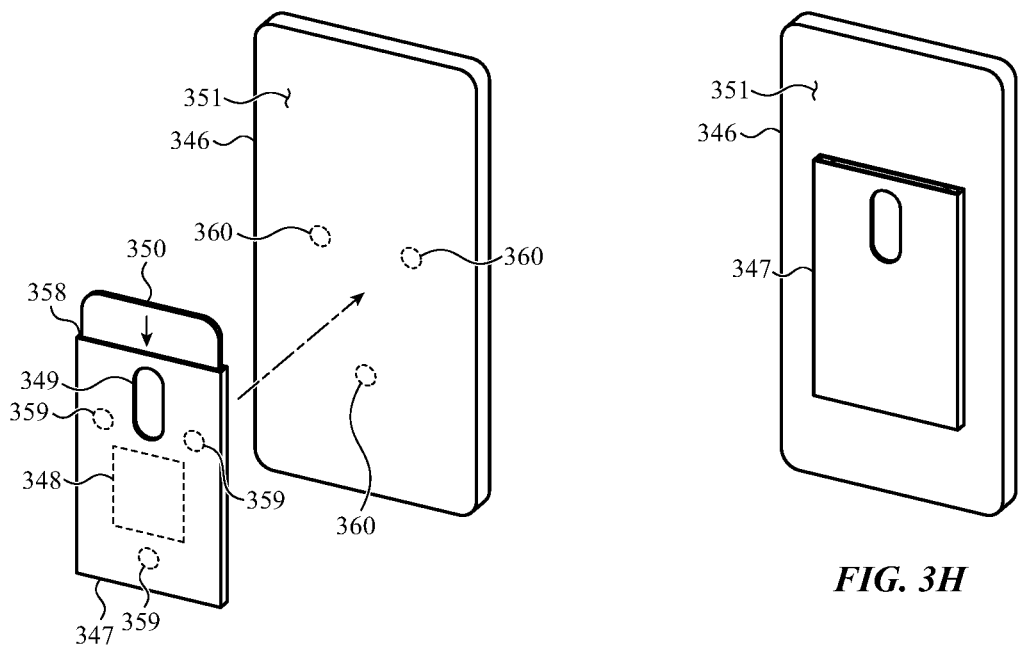
*FIG. 3G*
*FIG. 3H*
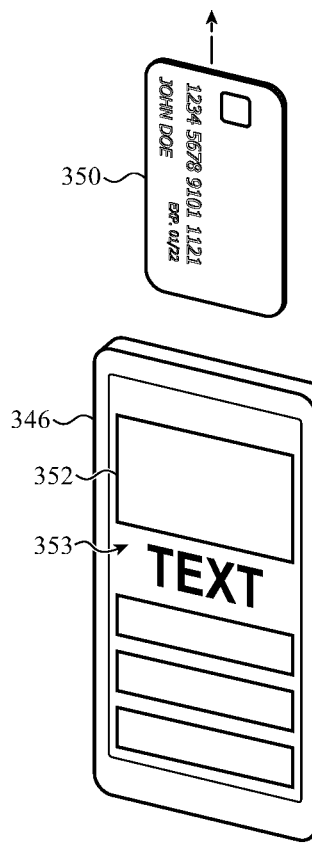
*FIG. 3I*

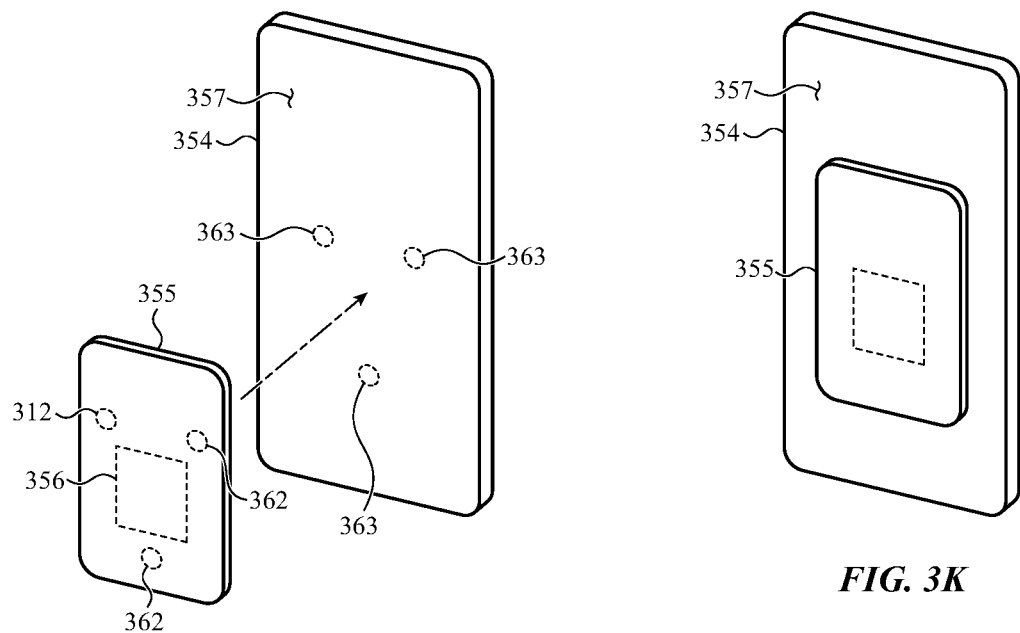
*FIG. 3J*
*FIG. 3K*
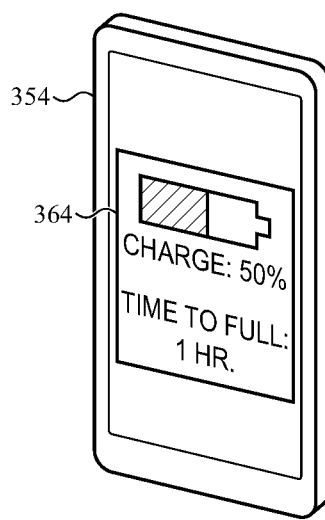
*FIG. 3L*

DYNAMIC USER INTERFACE SCHEMES FOR AN ELECTRONIC DEVICE BASED ON DETECTED ACCESSORY DEVICES

CROSS-REFERENCE TO RELATED APPLICATION

This application is a continuation of U.S. patent application Ser. No. 17/033,641, filed Sep. 25, 2020, the contents of which are incorporated herein by reference as if fully disclosed herein.

FIELD

The described embodiments relate generally to electronic devices, and more particularly to electronic devices and accessories that use near-field wireless communication systems to dynamically alter the operation of the electronic devices.

BACKGROUND

Handheld electronic devices such as mobile phones and tablet computers provide numerous functions and features, and use graphical user interfaces to allow users to interact with and control those functions and features. For example, handheld electronic devices display input objects such as icons, buttons, keys, and other graphical objects with which a user may interact to control the devices and their various functions. The devices may also display output objects, such as text or images, that convey information to the user.

SUMMARY

A system may include an electronic device that includes an enclosure having a transparent cover. The electronic device may also include a display positioned below the transparent cover and configured to display a first graphical output and a second graphical output different from the first graphical output, and a touch sensor positioned below the transparent cover and configured to detect touch inputs applied to the transparent cover. The system may also include a protective case that includes a shell defining a cavity and configured to at least partially cover the enclosure of the electronic device when the electronic device is positioned in the cavity, and a near-field wireless communication antenna coupled to the shell and detectable by the electronic device. In response to detecting the near-field wireless communication antenna, the electronic device may be configured to switch from the first graphical output to the second graphical output. The first graphical output may include a first background image, and the second graphical output may include a second background image different from the first background image.

The electronic device may be a mobile phone and the protective case may have an exterior surface having a color. The first graphical output may include a group of application icons and have a first color scheme and the second graphical output may include the application icons and have a second color scheme. The second color scheme may be different from the first color scheme and may correspond to the color of the exterior surface of the protective case.

The enclosure may define a back exterior side of the electronic device, a front exterior side of the electronic device, and a peripheral exterior side of the electronic device, the peripheral exterior side extending from the back exterior side to the front exterior side. The shell may further define a window region configured to allow a user to touch the front exterior side of the electronic device when the electronic device is positioned in the cavity, a back wall configured to at least partially cover the back exterior side of the electronic device, and a side wall configured to at least partially cover the peripheral exterior side.

The protective case may further include an input system that includes an actuation member configured to be actuated by a user and a passive antenna. Subsequent to detecting the near-field wireless communication antenna and in response to the actuation member being actuated by the user, the passive antenna may become detectable by the electronic device. The electronic device may be configured to execute an operation in response to detecting the passive antenna. The passive antenna may not be detectable by the electronic device when the actuation member is unactuated. The electronic device may further include a camera system, the second graphical output may correspond to an image-capture interface, and actuation of the actuation member may cause the electronic device to capture an image using the camera system.

A dock for an electronic device may include a support structure configured to position the electronic device in a viewable orientation when the dock is on a surface of an object, a near-field wireless communication antenna configured to cause the electronic device to display a graphical user interface in response to the electronic device being positioned on the support structure, and an input system configured to wirelessly communicate with the electronic device in response to the input system being actuated by a user when the electronic device is positioned on the support structure. The input system may include an actuation member and a passive antenna, and, in response to the actuation member being actuated by the user, the input system may wirelessly communicate with the electronic device using the passive antenna.

The graphical user interface may be a secondary graphical user interface, and the electronic device may be configured to switch from displaying the secondary graphical user interface to displaying a primary graphical user interface in response to being removed from the support structure.

The graphical user interface may correspond to an alarm clock function of the electronic device, and actuation of the input system may cause the electronic device to change a setting of the alarm clock function. The dock may further include a speaker, the graphical user interface may correspond to an audio playback function of the electronic device, and actuation of the input system may cause the electronic device to change an operational parameter of the audio playback function. The dock may further include a wireless charging system comprising an output coil configured to inductively couple to a charging coil of the electronic device when the electronic device is held by the support structure.

A handheld electronic device may include an enclosure, a display, a touch sensor positioned within the enclosure, and a near-field wireless communication system configured to detect when the handheld electronic device is in proximity to any one of a set of docking accessories. When the near-field wireless communication system detects that the handheld electronic device is in proximity to a first docking accessory of the set of docking accessories, the handheld electronic device may transition from a first mode of operation to a second mode of operation different from the first mode of operation, and, when the near-field wireless communication system detects that the handheld electronic device is in proximity to a second docking accessory of the set of docking accessories, the handheld electronic device may transition from the first mode of operation to a third mode of operation different from the first mode of operation and from the second mode of operation.

The first docking accessory may be in a first location and the second docking accessory may be in a second location different from the first location. Transitioning from the first mode of operation to the second mode of operation may include transitioning from displaying a primary graphical user interface comprising a set of application icons to displaying a first auxiliary graphical user interface comprising a first set of graphical objects that are relevant to the first location, and transitioning from the first mode of operation to the third mode of operation may include transitioning from displaying the primary graphical user interface to displaying a second auxiliary graphical user interface different from the first auxiliary graphical user interface and comprising second set of graphical objects that are relevant to the second location.

Transitioning from the first mode of operation to the second mode of operation may include transitioning from displaying a primary graphical user interface to displaying a first auxiliary graphical user interface, and transitioning from the first mode of operation to the third mode of operation may include transitioning from displaying the primary graphical user interface to displaying a second auxiliary graphical user interface different from the first auxiliary graphical user interface. The first auxiliary graphical user interface may include a first user-defined set of graphical objects selected from a group of candidate graphical objects and the second auxiliary graphical user interface may include a second user-defined set of graphical objects selected from the group of candidate graphical objects. The first user-defined set of graphical objects may include an audio control input object. The second user-defined set of graphical objects may lack the audio control input object. The first user-defined set of graphical objects may be arranged on the display according to a user-defined arrangement.

BRIEF DESCRIPTION OF THE DRAWINGS

The disclosure will be readily understood by the following detailed description in conjunction with the accompanying drawings, wherein like reference numerals designate like structural elements, and in which:

FIGS. 3D-3F depict the device of FIG. 1A being used with another example protective case;

FIGS. 3G-3I depict a device being used with an example removable accessory;

FIGS. 3J-3L depict a device being used with another example removable accessory;

DETAILED DESCRIPTION

Figure 1A:
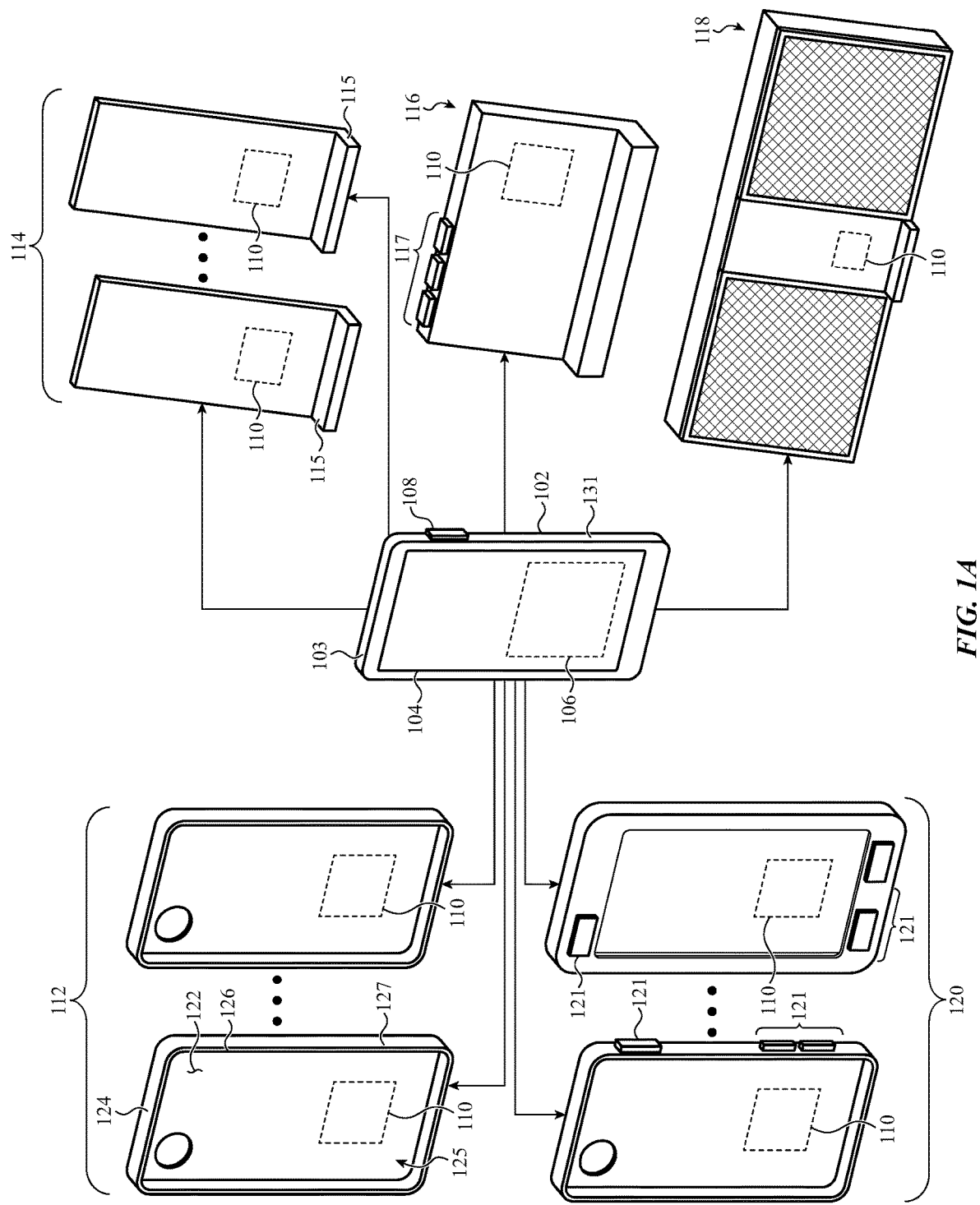
FIG. 1A depicts an example system including an electronic device and associated accessories.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to a system of electronic devices and electronic device accessories that use near-field wireless communication techniques to dynamically modify or change how a device operates. For example, various different accessories for electronic devices may each include near-field wireless communication antennas that allow the accessories to be detected and identified by the electronic device. Once a particular accessory is detected near the electronic device, the electronic device may change its mode of operation in a manner that is unique to that particular accessory or type of accessory.

Various different types of accessories may be configured to use near-field wireless communication systems to affect the operational modes and/or characteristics of devices that are using those accessories. For example, a protective case for a mobile phone may be configured to change the operational mode of the mobile phone in one manner, while charging docks change the operational mode of the mobile phone in another manner, while an "alarm clock" docking accessory changes the operational mode of the mobile phone in yet another manner. The change in operational mode may correspond to and/or be accompanied with a change in the graphical user interface or graphical output that is displayed by the mobile phone. For example, when the mobile phone is placed in a sport-focused protective case, the mobile phone may, without additional user input, replace its primary graphical user interface (or any graphical user interface that is currently active) with a sport-focused interface. As another example, when the mobile phone is placed on a speaker dock, the mobile phone may replace its primary graphical user interface with a set of audio playback controls. The graphical user interfaces that are activated when a device is used with an accessory may therefore be customized to a particular function or set of functions that are relevant to the associated accessory. In some cases, these graphical user interfaces may be simpler than a primary graphical user interface (e.g., having fewer and/or larger graphical objects), which may help facilitate more efficient use of the device and may be dedicated to a particular function set or operational mode of the device.

In some implementations described herein, one or more graphical outputs that are displayed on the device are changed or switched in response to detecting the protective case. As used herein, graphical outputs may be used to refer to visible output from a display. Graphical outputs may include graphical user interfaces, graphical objects, images, videos, and/or other visible outputs produced by a display.

Graphical user interfaces may include various types of graphical objects, including icons, menu items, status bars, menus, graphical objects indicating information such as wireless signal strength, time, battery charge level, and the like. Graphical user interfaces may also include graphical outputs such as background images. Graphical objects may be visually differentiable from other graphical objects, and the boundaries and/or borders of a graphical object may suggest functional distinctions between different graphical objects. For example, the boundary and/or border of a first icon (e.g., a first graphical object) may visually differentiate the first icon from a second icon, and may indicate to a user that the two icons define different input areas and will, if selected, cause a device to take different actions.

As used herein, the terms "switch" or "change" a graphical output may be used to refer to a scenario in which one graphical user interface, graphical object, or other displayed item is exchanged with another graphical user interface, graphical object, or other displayed item. The terms "switch" or "change" may also be used to refer to a scenario in which a graphical user interface, graphical object, or other displayed item is modified to produce a visually distinct or visually perceptible effect. For example, a background or color scheme of one or more graphical objects in a graphical user interface may be "switched" or "changed" to appear to have a different color, texture, or other visually perceptible feature. For clarity, the switched or changed graphical output may be referred to as a second graphical output even though, other than an appearance, the graphical output may represent the same item or perform the same function when selected.

For the purposes of this disclosure, accessories may include, without limitation, protective cases, gaming cases, camera cases, and docks (e.g., speaker docks, alarm clock docks, charging docks, unpowered docks, etc.). Cases, such as protective cases, gaming cases, camera cases, may be accessories that are configured to receive an otherwise complete device, such as a mobile phone, and may provide additional functionality to the device (e.g., physical protection, appearance, attachment mechanisms, etc.). Such accessories that include near-field wireless communication antenna and cause an electronic device to change or modify the operational mode and/or characteristic of the electronic device when the device and the accessory are in proximity to one another may be referred to herein as a near-field wireless enabled accessory.

The changing or modifying of the operational mode and/or characteristics of electronic devices may be facilitated by near-field wireless communications that allow the electronic devices to determine when they are being used with the accessories. For example, the accessories may include near-field wireless communication antennas, and the devices may include near-field wireless communication systems that can detect when the device is in close proximity to the near-field wireless antennas (e.g., the device can detect when it has been installed in, coupled to, placed on, or is otherwise being used with the accessory). The device may also receive, from the near-field wireless communication antenna, information about the particular accessory such as a unique identifier.

The near-field wireless communication systems and antennas may be configured so that an accessory is detected by a device only when the device is sufficiently close that it is substantially certain that the device and the accessory are being used together. For example, in the case of a protective case for a mobile phone, the mobile phone may detect the presence of the case only once the phone is inserted into the protective case. In the case of a docking accessory (also referred to herein as a "dock"), the mobile phone may detect the presence of the docking accessory only once the mobile phone is physically placed on the docking accessory. Further, the near-field wireless communication antennas may be passive or un-powered antennas, allowing dynamic device customization to occur even with un-powered accessories. As used herein, passive or un-powered antennas refer to antennas that are not conductively coupled to an electrical power supply of the accessory. Accordingly, a protective case need not have batteries or independently powered communications systems (e.g., WIFI or Bluetooth) in order to change the operational mode or other characteristic of the electronic device. In some cases, however, devices may include both un-powered near-field wireless communication antennas as well as powered communications systems.

By providing a series of different accessories that can each customize the operation or user interface of a mobile device in a different way, the mobile device may become an even more dynamic, useful tool. For example, throughout a day, a user may place a mobile device in a workout case for a morning workout, in a charging dock during work, in a kitchen dock in the evening, and in an alarm clock dock at night. The concepts described herein allow the device to automatically transition to a workout interface when it is placed in the workout case, to a work interface when it is placed in the charging dock, to a cooking interface when it is placed in the kitchen dock, and to an alarm clock interface when it is placed in the alarm clock dock, among numerous other possible transitions. The device may also transition back to a main or primary interface when it is removed from those docks (or in response to a user request regardless of its proximity to an accessory). In this way, the device continuously and automatically adapts to its intended use and provides a tailored user interface to its user.

Further, the device may use other inputs and/or information to determine how to change or modify its operations when the device is being used with a near-field enabled accessory. For example, when the device detects that it has been attached to a dock of an exercise bike, it may also determine the location of the device. If the location is a first location (e.g., a home location), the device may take a different set of actions than if the location is a second location (e.g., a fitness center or gym). In the home location, the device may initialize a first set of user controls, such as a set of media controls for the user's home media system (e.g., the user's television, stereo equipment, etc.) and a fitness tracking interface, while in the fitness center, the device may initialize a second set of user controls, such as the fitness tracking interface and a set of media controls for a personal streaming service (e.g., to provide audio to the user's personal headphones). As another example, when the device detects that it has been placed on a dock in a kitchen, the device may also determine who is using the device. If it is a first user, the device may display one set of interface elements (e.g., a recipe for a smoothie and an editable grocery list), and if it is a second user, the device may display a second set of interface elements (e.g., a recipe for a pasta sauce and a set of media controls for the user's home media system).

Information from any sensor and/or sensor system of a device may be used to provide additional contextual information about the device, its use, its user, or the like, in order to provide highly customized and tailored user experiences. Such sensors and/or sensor systems may include, without limitation, integrated cameras, GPS or other navigation or location-finding systems, thermal sensors, accelerometers, magnetometers, biometric identification systems (e.g., facial recognition, fingerprint recognition, voice recognition), biometric sensors (e.g., heart-rate monitors, electrocardiographs, pulse oximeters), or the like. Other types of information not detected by an onboard sensor may also be used to provide additional contextual information about the device, its use, its user, or the like. Such information includes, without limitation, current or predicted weather information, date and time information, calendar entries, recently opened or closed applications, text or email messages, or the like. Such information may be stored on the device, accessed via a communications network, or the like. In some cases, devices use information about an accessory (from a near-field wireless connection with the accessory) together with additional contextual information (e.g., from a sensor system or other information source) to determine how to change, modify, or affect the device's operation. For example, the device may determine which application to initiate based on the near-field wireless connection and a location of the device. Examples of using additional contextual information to determine how to change or affect the operation of a device being used with a near-field wireless enabled accessory are provided herein.

FIG. 1A depicts an example system in which an electronic device 100 (also referred to herein simply as "device") may be used with various different accessories that cause the device 100 to transition between operating modes when the device 100 is used with those accessories. The electronic device 100 is an example of an electronic device, such as the electronic device 800 described herein with respect to FIG. 8. As described herein, transitioning between operating modes may include and/or be accompanied by the initiation and/or termination of applications (e.g., initiating or terminating an application in response to detecting accessories), changes in the graphical user interface or graphical output displayed by the device 100 (e.g., changes in the color, content, appearance, size, icons, or information of a graphical user interface), changes in device settings (e.g., alert volume, haptic or tactile output strength, screen brightness), or the like. Transitioning between operating modes (or between different graphical user interfaces or other graphical outputs) may or may not include or be accompanied by a visual animation, sequence, or other graphical effect indicating or occurring during the transition.

The device 100 shown in FIG. 1A is a mobile phone (e.g., a smartphone), but this is merely one representative example of a device that may be used in conjunction with the ideas disclosed herein. Other example devices include, without limitation, music/media players, tablet computers, laptop computers, wearable electronic devices, watches (e.g., mechanical, electrical, or electromechanical), and the like.

The device 100 includes an enclosure 102 that defines the exterior surfaces of the device 100. The enclosure 102 may include, for example, a housing member 103 that defines a back exterior side of the device 100 (e.g., back side 201, FIG. 2), a front exterior side of the device 100, and a peripheral exterior side 131 of the device 100, the peripheral exterior side extending from the back exterior side to the front exterior side. The housing member 103 may be a single piece of material (e.g., a monolithic component), or multiple discrete components. The enclosure 102 may also include a transparent cover 105 that covers or otherwise overlies a display 104 and/or a touch sensitive surface (e.g., a touchscreen) of the device 100, and may define a front exterior front surface of the device 100. The display 104 is configured to display graphical outputs, and the graphical outputs may be visible through the transparent cover 105 or at least a region of the transparent cover 105. The transparent cover 105 may also define one or more openings to allow internal components such as microphones, cameras, speakers, sensors, and the like, to have access to the surrounding environment of the device 100. The device 100 may also include a touch sensor that is configured to detect touch events or touch inputs applied to the transparent cover 105. The touch sensor may be integrated with the display or otherwise configured to provide touchscreen functionality.

The device 100 may include a near-field wireless communication system 106 that is configured to wirelessly detect when the electronic device is in proximity to any one of a group of near-field wireless enabled accessories. The near-field wireless communication system 106 may be configured for any suitable type or protocol of near-field wireless communications, including but not limited to near-field communications ("NFC") protocols, radio frequency identification ("RFID") protocols, or any other suitable type or protocol. For example, the near-field wireless communication system 106 (and indeed any near-field wireless communication system, antenna, or other component described herein) may be configured to operate in accordance with applicable standards, such as ISO/IEC 14443, FeliCa, ISO/IEC 18092, ISO/IEC 21481, ISO/IEC 13157, or the like.

In some cases, the near-field wireless communication system 106 is configured to detect the presence or proximity of passive or un-powered antennas that are incorporated in the accessories. As such, the near-field wireless communication system 106 may be separate from other communication systems in the device 100, such as Bluetooth, WIFI, or cellular communications systems, and may be configured to communicate over a limited range (e.g., the near-field wireless communication system 106 may only detect a near-field wireless antenna when they are within about 10 cm from each other).

The device 100 may include physical inputs, such as a button 108, with which a user can interact to control operations of the device 100. The particular function of the button 108 may be changed based on the accessory with which the device 100 is associated at a given time. For example, as described herein, in a primary operating mode, the button 108 may serve to activate or deactivate the screen of the device 100. In a second operating mode, such as when the device 100 is in a case intended for capturing photographs, the button 108 may operate as a shutter button to capture an image. While the device 100 is shown having one button 108, this is merely representative and the device 100 may include more or different input mechanisms, including for example separate volume control buttons, fingerprint sensors, rotatable input members, keys, a keyboard, or the like. The device 100 may also include a wireless charging system, described with respect to FIG. 2.

The device 100 may also include various additional internal components and structures, such as sensor(s), memory, processor(s), control circuitry, a battery, circuit board (s), a frame or other supporting structure, antenna(s), or the like. The device 100 may also include front and/or rear facing camera systems (e.g., a rear-facing camera 214, FIG. 2) that can capture images and/or video of external subjects. The camera systems may include lenses, image sensors, focusing and zooming mechanisms, flashes, and any other suitable components.

Additional or different components may also be positioned within the enclosure 102 of the device 100. The device 100 may also include various systems and/or components that can receive information from or about a user or the user's surroundings (e.g., touchscreens, microphones, biometric sensors, GPS systems). It is well understood that the use of personally identifiable information (such as information from or about a user or the user's environment and that is stored on or accessible by a device) should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The system shown in FIG. 1A also includes various types of accessories that can be used with the device 100. For example, FIG. 1A includes protective cases 112, docks 114, a dock 116 with auxiliary input systems 117, a speaker dock 118, and protective cases 120 with auxiliary input systems 121. As described herein, the device 100 may be useable with each of these accessories (as well as others not shown in FIG. 1A), and as the user switches from one accessory to another, the device 100 may dynamically switch to a different operational mode, present a different graphical user interface or graphical output (e.g., present a graphical user interface having different content or a different appearance, color or the like), change a device setting, or otherwise operate in a manner that is tailored to the particular accessory with which the device 100 is being used. Docks, such as the docks 114, may include stand-alone accessories as well as docks that are integrated into other devices, such as exercise equipment (e.g., bicycles, rowing machines, elliptical machines, stair-climbing machines, or the like), vehicles, musical equipment (e.g., guitars, amplifiers, keyboards, etc.), or the like. The docks 114 are shown with optional ledges 115 that support or prop the device 100 in a convenient viewing position. In some cases, the docks 114 may lack the ledges 115, and the device 100 may be retained to the dock 114 and/or maintained in a particular orientation or position using magnetic attachment features in the dock 114 and the device 100.

Each accessory may include a near-field wireless communication antenna 110 (also referred to herein simply as "antenna") that is detectable by the near-field wireless communication system 106 of the device 100. As used herein, an antenna may be detectable insofar as the antenna or near-field wireless communication circuitry is capable of producing an electrical response when probed or polled by a wireless detection device or circuitry. For example, the antenna may produce a distinct or recognizable disturbance or other response to an electromagnetic field produced by another device or circuit, thereby rendering the antenna detectable. Further, as used herein, a near-field wireless communication antenna being detectable indicates that the near-field wireless communication antenna may be operable to trigger, initiate, or otherwise cause a response in a near-field wireless communication system of a device, where the response indicates that the near-field wireless communication antenna is in the presence and/or proximity of the device (e.g., within a threshold distance).

When the device 100 detects that it is being used with one of the accessories in FIG. 1A, for example because it is within a short distance of an accessory (e.g., less than about 10 cm), the detected antenna 110 causes the device 100 to change a mode of operation. As used herein, changing a mode of operation may refer to or include changing a graphical output of the device (e.g., temporarily or permanently changing a color scheme of some or all of a graphical user interface, changing between different graphical user interfaces, initiating the display of graphical objects), changing one or more device settings, or combinations of these. To facilitate this functionality, each antenna 110 may include some identifier or other information that uniquely identifies that accessory (or that type of accessory) or may otherwise be configured to uniquely modify the operation of the device 100. In this way, the operation of the device 100 may dynamically change as a user changes from accessory to accessory.

The antennas 110 may be any suitable type of antenna that is detectable by the near-field wireless communication system 106 of the device 100. For example, the antennas 110 may be NFC antennas, RFID antennas, or the like. In some cases, the antennas 110 may be passive or un-powered antennas. Accordingly, the accessories need not be powered or include batteries or other power sources to cause the device 100 to change its operational mode. This may allow accessories to be smaller, thinner, lighter, and more portable than they would be if they required power sources. In some cases, an antenna 110 may be powered by a power source internal to or otherwise connected to an accessory. Also, accessories that use power for other purposes (e.g., speakers, amplifiers, etc.) may use passive or un-powered antennas despite the availability of power at the accessory.

The near-field wireless communication antennas 110 may be positioned in the accessories so that they are aligned with or otherwise suitably located so that they can be detected by the near-field wireless communication system 106 when the device 100 is being used with the accessory. Thus, for example, when the device 100 is installed in a protective case 112, the near-field wireless communication antenna 110 of that case may be substantially aligned with the near-field wireless communication system 106 of the device 100 (e.g., within about 2 cm, or about 1 cm). The antenna and near-field wireless communication system 106 may be similarly aligned when the device 100 is placed on a dock 114, 116, or 118.

Figure 1B:
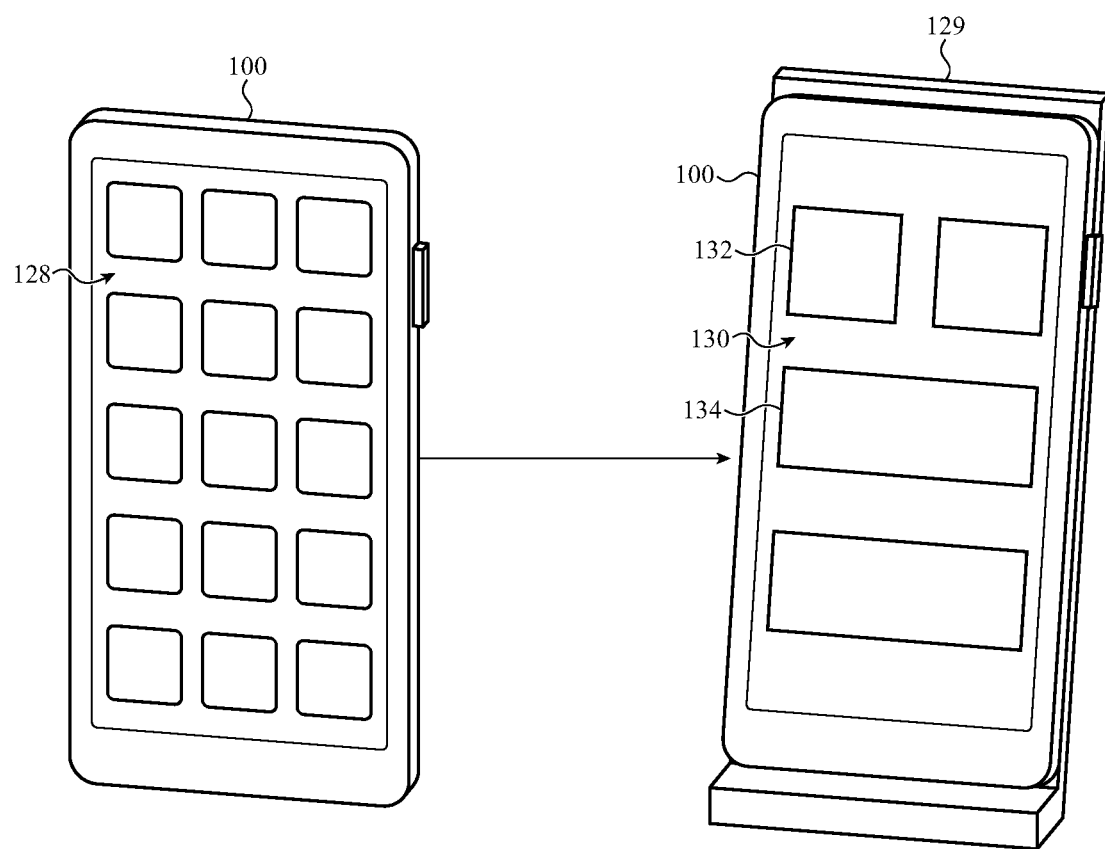
FIG. 1B depicts the device of FIG. 1A and an example accessory in use together.

As described, the device 100 may dynamically change its operational mode when it is used with different accessories. In some cases, changing operational modes includes changing between different graphical user interfaces. FIG. 1B depicts the device 100 displaying a primary graphical user interface 128 when the device 100 is not being used with an accessory (when it is being used with an accessory that causes the device 100 to display the primary graphical user interface 128), and displaying a different graphical user interface 130 when the device 100 is being used with an accessory 129 (shown in this example as a dock).

The primary graphical user interface 128 may include selectable icons (e.g., application icons that, when selected, cause applications to be executed and/or initialized, or otherwise cause graphical user interfaces associated with the applications to be displayed) or other graphical objects that correspond to applications or other functions of the device 100. The primary graphical user interface 128 may also include status bars, menus, graphical objects indicating information such as wireless signal strength, time, battery charge level, and the like. The primary graphical user interface 128 may be automatically displayed when the device 100 is turned on, and may be considered the top level graphical user interface of the device 100 (or the highest hierarchical level of a multi-level graphical user interface scheme). The primary graphical user interface 128 may also be referred to as a "home screen," and may be a main starting interface for an operating system of a device. The primary graphical user interface 128 may also have a color scheme, which may refer to the color or colors of background images, borders, screen areas, icons, or the like. As used herein, a secondary graphical user interface may refer to any graphical user interface other than the primary graphical user interface.

When the device 100 is placed on an accessory and is positioned by the accessory so that the device 100 can be seen and interacted with, the device 100 may change from the primary graphical user interface 128 to another graphical user interface. For example, as shown in FIG. 1B, when the device 100 is placed on an accessory 129, the device 100 may change from the primary graphical user interface 128 to a second graphical user interface 130 that is different than the primary graphical user interface 128. The second graphical user interface 130 is merely one of numerous possible examples of graphical user interfaces that are different from the primary graphical user interface 128 and to which the device 100 may switch in response to the device 100 being used with an accessory. The change from the primary to the second graphical user interface may be triggered by the device 100 detecting the near-field wireless communication antenna in the accessory 129.

The second graphical user interface 130 may have a different set of icons, inputs, outputs, or other types of graphical objects as compared to the primary graphical user interface 128. For example, the second graphical user interface 130 lacks the application icons of the primary graphical user interface 128, and instead includes other graphical objects, such as graphical objects 132 and 134. The graphical object 132 may be a "world clock" graphical object (e.g., displaying the times of multiple time zones), and the graphical object 134 may be an "audio control" graphical object (e.g., displaying now-playing information and including audio control affordances such as play, pause, skip forward, skip backwards, etc.). Accordingly, the second graphical user interface 130 includes different graphical content and provides different device functions than the primary graphical user interface 128. The device 100 may automatically change back from the second graphical user interface 130 to the primary graphical user interface 128 when the device 100 is removed from the dock 129, or in response to a user input received while the device 100 is on the dock 129.

Figure 2A:
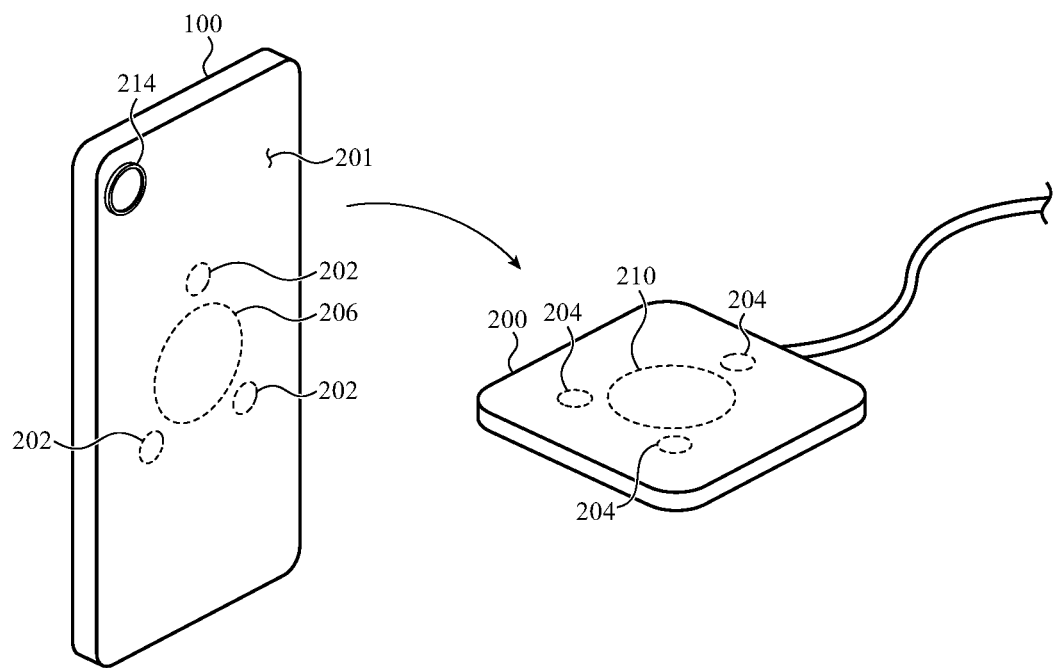
FIGS. 2A-2B depict an example wireless charging system for the device of FIG. 1A.
Figure 2B:
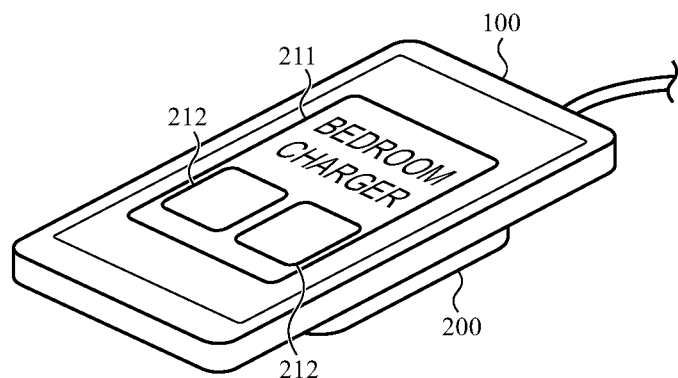

FIGS. 2A-2B illustrate a wireless charging system for the device 100. FIG. 2A, for example, shows a back view of the device 100 and a charging dock 200 that is configured to wirelessly charge the device 100 when the device 100 is placed on the charging dock 200. FIG. 2B illustrates the device 100 positioned on the charging dock 200 in a charging configuration (e.g., with the back surface of the device 100 resting on the upper surface of the dock 200).

The device 100 includes a charging coil 206 within the device 100 and configured to inductively couple to an output coil 210 of the charging dock 200 to charge the device 100. More particularly, the output coil 210 of the charging dock may produce an electromagnetic field, which in turn induces a current in the charging coil 206 of the electronic device, and the induced current may be used to recharge the device's battery.

The device 100 may include a set of magnetic attachment features, such as magnets 202, that are configured to facilitate alignment and retention of the device 100 to the charging dock 200. The charging dock 200 may include a set of complementary magnets (or ferromagnetic materials) 204 that are attracted to the magnets 202 to further facilitate alignment and retention of the device 100 to the charging dock 200. For example, the magnets 202 and complementary magnets (or ferromagnetic materials) 204 may be configured so that when the device 100 is brought into close proximity of the dock 200 by a user (e.g., within 2 cm, 1 cm, or another suitable range), the magnets 202 and complementary magnets 204 pull the device 100 towards the dock 200 and into a position that aligns the output coil 210 of the dock 200 with the charging coil 206 of the device 100. The magnetic attraction may also provide a retention force to hold the device 100 in the aligned position and prevent the device 100 from slipping off the dock 200 during charging. While FIG. 2A describes the device as including magnets 202 and the dock 200 as including magnets or magnetic materials 204, it will be understood that any materials or combinations of materials that are magnetically attracted to one another may be used in either the device 100 or the dock 200. Further, the magnets and/or magnetic materials may be arranged so that the device 100 magnetically couples to the dock 200 in only one orientation. This may further help prevent misalignment and helps ensure that the wireless charging function can operate efficiently. In some cases, other techniques for aligning the device 100 with the dock 200 may be used instead or in addition to the magnets, such as alignment pins and recesses, clips, complementary shaped surfaces, or the like.

In some cases, the dock 200 may include a near-field wireless communication antenna, similar to the antennas 110 described with respect to FIG. 1A. In this way, the device 100 can detect when it has been placed on or is otherwise being held by the dock 200 using the same near-field wireless communication system that it uses to detect the presence of other accessories. (In other cases, the device 100 can communicate with the dock 200 using the charging and output coils or via another wireless protocol or technique.) When the device 100 detects that it is positioned on the dock 200 via the near-field wireless communication system, it may change its mode of operation in a way that is tailored to the dock 200. For example, as shown in FIG. 2A, the device 100 may display a graphical object 211 on the display 104. The graphical object 211 may be an overlay over a blank screen or over a primary graphical user interface of the device 100. The graphical object may include inputs and outputs that are contextually related to the dock 200 and/or the charging operation provided by the dock 200. For example, as shown the graphical object 211 displays a name or description of the dock 200 (e.g., "Bedroom Charger"), as well as inputs 212 that may control one or more aspects of the charging operation. For example, the inputs 212 may allow the user to select different charging modes or different power consumption modes of the device 100.

Other inputs and outputs may also be included instead of or in addition to those shown in FIG. 2B. For example, the graphical object may include inputs and outputs that are relevant to a room where the dock 200 is located. As used herein, a graphical object or graphical user interface may be considered relevant to a location, room, accessory, or the like, if the graphical object or graphical user interface provides access to functions or information that are germane to a context of the location. Thus, for example, if the dock 200 is in a bedroom, the graphical object may include an input for activating or deactivating an alarm. If the dock 200 is in a living room, the graphical object may include an input for controlling audio playback of the device 100 or a connected audio system (e.g., a home stereo or other device). If the dock 200 is in a kitchen, the graphical object may include a recipe interface and one or more timers. If the dock 200 is in a music room, the graphical object may include audio controls and a musical notation interface. In some implementations, an association of an accessory (e.g., a dock) with a particular room is based on an assignment of the accessory to a virtual room in a smart home platform. A smart home platform may include numerous virtual rooms or environments, and devices and/or smart accessories may be associated with particular ones of the rooms and/or environments. For example, devices such as a television, audio system, and wirelessly-controllable lights may be assigned to a "living room" environment. In some implementations, a dock (e.g., the dock 200) is also associated with or assigned to the "living room" environment in the smart home platform. Accordingly, in some implementations, in response to being placed on the dock in the living room, the device detects that the dock is associated with the "living room" environment, and displays graphical objects that are configured to control the devices assigned to the "living room" environment (e.g., the television, audio system, and lights that are in the living room).

While FIGS. 2A-2B show a wireless charging system incorporated in a dedicated charging dock, wireless charging systems analogous to those described with respect to FIGS. 2A-2B may be incorporated into the other accessories described herein. For example, a protective case may include a supplemental battery and an output coil to charge the device 100 when the device 100 is inserted into the case. Similarly, an output coil and alignment magnets may be incorporated into a speaker dock or alarm clock dock to allow the device 100 to charge when the device 100 is positioned on the dock. Also, wireless charging systems may be incorporated into a stand-alone battery accessory that is configured to attach to the device and wirelessly charge the device from the battery. An example battery accessory is described herein with respect to FIGS. 3J-3L.

Figure 3A:
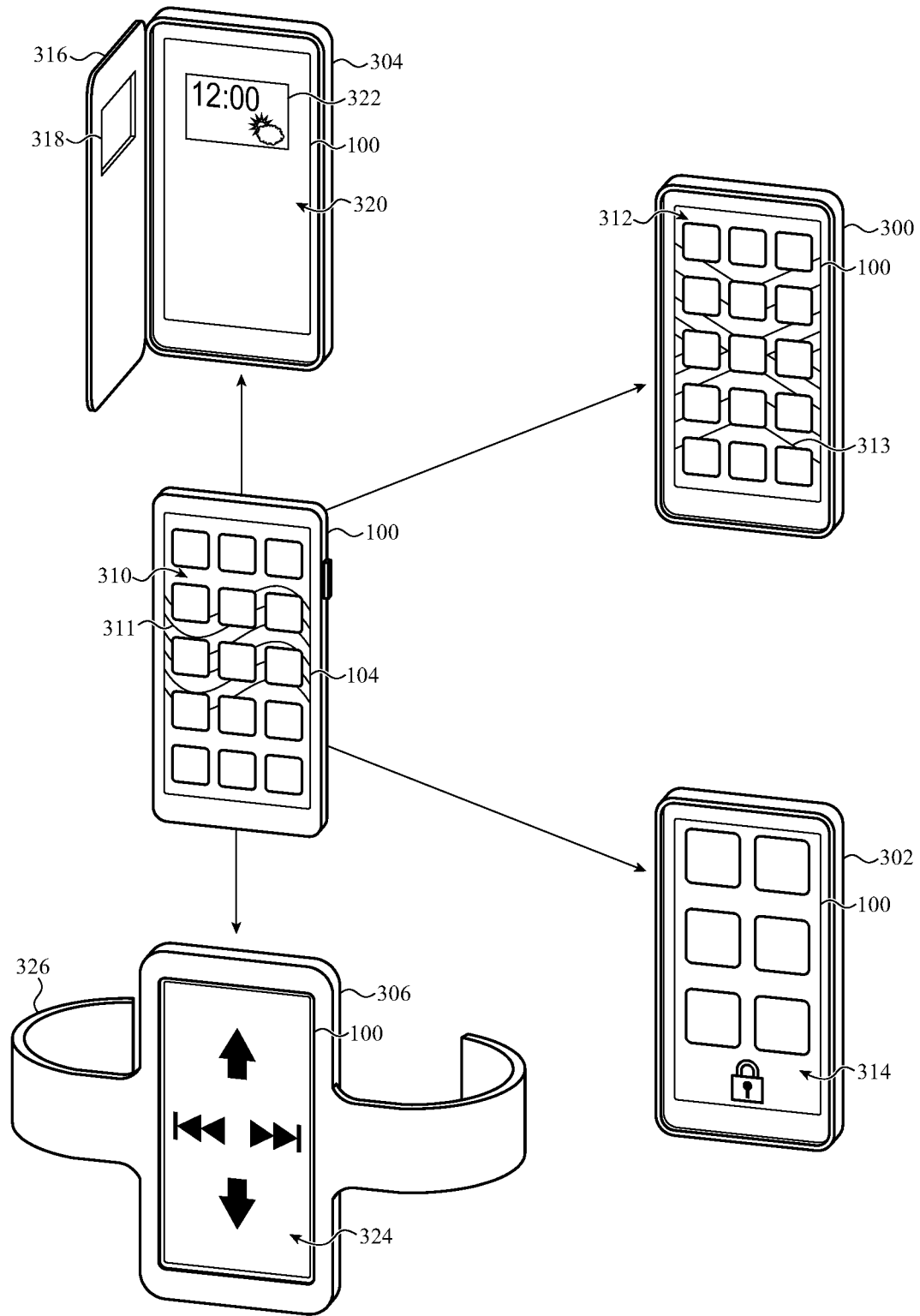
FIG. 3A depicts several example protective cases for the device of FIG. 1A.

As described above, a device 100 may use a near-field wireless communication system to detect that it is being used with an accessory, and to identify that particular accessory. Further, because near-field wireless communication antennas do not need to be powered in order to communicate with or be detectable by the near-field wireless communication system of a device, even simple accessories such as protective cases and simple device stands can trigger the device to change its mode of operation or otherwise modify its behavior. FIG. 3A illustrates several examples of protective cases for a device, such as the device 100. The protective cases shown in FIG. 3A may be embodiments of the protective cases 112 in FIG. 1A. Each protective case in FIG. 3A may include a near-field wireless communication antenna 110, but may lack other circuits or components that interact with the device 100. Thus, even a simple protective case that appears to be nothing more than a single-piece of plastic or rubber may cause the device 100 to change its operation in a different or unique way.

With reference to FIG. 1A, the protective cases in FIG. 3A may each include a shell 124 that defines a cavity 125 in which the device 100 may be positioned. The shell 124 may be configured to at least partially cover the enclosure of the device 100 when the device 100 is positioned in the cavity 125. The shell 124 may further define a back wall 122 that is configured to at least partially cover the back exterior side of the electronic device (e.g., side 201, FIG. 2A) and a side wall 127 configured to at least partially cover the peripheral exterior side 131 of the device 100. The shell 124 may also define a window region 126 configured to allow a user to touch the front exterior side of the electronic device (e.g., the transparent cover 105) when the device 100 is positioned in the cavity 125. The window region 126 may be an open area such that the protective case covers all or substantially all of the back and side surfaces of the device 100, but leaves the transparent cover 105 substantially uncovered (e.g., such that more than 50%, 60%, 70%, 80%, 90%, 95%, or 99% of the front surface of the transparent cover 105 is uncovered).

The walls of the shell 124 (e.g., the back wall 122 and the side wall 127) may be relatively thin. For example, in some cases, each of the walls of the shell 124 have a thickness less than about 4 mm, about 3 mm, about 2 mm, about 1.5 mm, about 1 mm, or any other suitable dimension. The shell 124 may increase the overall size of the device (e.g., the combined size of the shell with the device installed) by a small enough amount that the primary functionality of the device 100 is not fundamentally altered as a result of installing the device 100 in the protective case. For example, if the device 100 is a mobile phone that may be held and operated by a user's hand (e.g., a single hand), the device 100 the same or substantially the same use and/or handling characteristics may be preserved when the device 100 is in the protective case (e.g., it can still be held and operated by one hand). If the device 100 is a tablet that may be held and operated by one or two hands, it may be held and operated in the same or similar way even when it is inserted in the protective case.

Each protective case in FIG. 3A may also include a near-field wireless communication antenna 110 coupled to its shell and configured to cause the device 100 to switch from displaying the first graphical user interface (or graphical output) to displaying a different graphical user interface (or graphical output) in response to the electronic device being positioned in the cavity. FIG. 3A shows how various different examples of protective cases may switch the graphical user interface of the device 100. For example, the device 100 in FIG. 3A that is not in a protective case is shown displaying a first graphical user interface 310. The first graphical user interface 310 may be a default or primary graphical user interface, such as the primary graphical user interface 128, FIG. 1B. In some cases, this graphical user interface 310 may display selectable icons (e.g., application icons that, when selected, cause applications to be executed and/or initialized, or otherwise cause graphical user interfaces associated with the applications to be displayed) or other graphical objects that correspond to applications or other functions of the device 100. The first graphical user interface 310 may also have a background image 311. The background image 311 may also be referred to as a wallpaper, and may be an image that is graphically behind the application icons of the graphical user interface. In some cases, the first graphical user interface 310 may act primarily as an application selection screen. (The device 100 may also have a "lock screen" or "wake screen" that is displayed when the display is active but the device 100 is locked. The lock screen may also have a background image, which may also be referred to as a wallpaper.

The case 300 may be configured to cause the device 100 to cease displaying a first graphical output (e.g., the first graphical user interface 310) and instead display a second graphical output 312 that is different than the first graphical output. As used herein, a second graphical user interface or graphical output may refer to any graphical user interface or graphical output that is different from the first graphical user interface or graphical output.

When the device 100 is placed in the case 300, the near-field wireless communication system 106 of the device 100 detects the near-field wireless communication antenna of the case 300 in close proximity to the device 100 (e.g., within about 10 cm, 5 cm, 2 cm, or the like), and receives information from or about the case 300 from the antenna. The antenna may communicate an executable command to the device 100, or it may communicate data that the device uses to select or lookup a command or routine or otherwise determine how to change its operation.

The graphical output 312 that is initiated by the case 300 may include the same application icons and provide the same functions as the first graphical user interface 310, but have a different background image 313. Thus, when the user installs the device 100 into the case 300, the device 100 may automatically transition to a different background image. In some cases, the different background image 313 is a modified version of the background image 311. For example, a hue, saturation, color balance, or other image property of the background image 311 may be modified to produce the different background image 313.

The different background image 313 may relate in some way to the case 300. For example, if the case 300 is blue, the background image 313 may be blue, or if the case 300 has a rainbow decoration on it, the background image 313 may be a rainbow. Accordingly, the graphical user interface 310 may change or morph to graphically match or coordinate with the case 300. In this way, a user can switch between cases having different colors, designs, appearances, or the like, and the appearance of the graphical output of the device 100 will automatically change based on the case to which it is coupled.

In addition to or instead of changing the background image, the device 100 may display a second graphical output that includes the same icons and background image as a primary graphical user interface, but has a different color scheme. A color scheme for a graphical user interface may include particular colors for backgrounds, application icons, status bars, informational icons, and the like. The color scheme of the second graphical output may match or otherwise correspond to a color of an exterior surface of accessory (e.g., the case 300) in which the device 100 is installed. For example, if the accessory is yellow, the second graphical output may include graphical elements that have the same or similar yellow color as the case. Notably, these elements may have a different color when the device 100 is not installed in the case. In some cases, at least one graphical element of the second graphical output has the same color as the accessory.

Other changes to the graphical user interface 310 (or other graphical outputs displayed by the device 100) are also contemplated. For example, instead of or in addition to switching to a different background image, the device 100 may change the arrangement of its icons, or the content or appearance of a lock screen, change an overall color scheme of the graphical user interface and/or background image, or the like.

Another case, such as the case 302, may have an antenna that causes the device 100 to transition from the first graphical user interface 310 to yet another graphical user interface 314 (e.g., a second graphical user interface). The graphical user interface 314 may be a restricted environment that reduces or otherwise changes the number or type of available application icons, optionally changes the size of the icons, and locks the interface so that a user cannot leave the restricted environment without a password or other type of authentication. In addition to changing the graphical user interface, other aspects of the device operation may be modified or changed. For example, notifications (e.g., ringer sounds, message previews, etc.) may be turned off or changed to a different mode (e.g., where message content previews are not displayed). As another example, access to media stored on the device 100 may be restricted or limited, such as restricting movies or songs based on a rating. In this way, the case 302 may be especially suited for use when the device 100 is being given to a child or friend for temporary use, where the owner of the device 100 may wish to limit access to certain applications or functions.

Where the case 302 acts as a child-focused case, the case 302 itself may include physical features that may be useful for a device being used by a child. For example, the case 302 may have extra padding or other protection to prevent damage during falls, sealing to prevent damage from spills, clear screen covers to prevent damage to or soiling of a transparent cover, grips or other features to facilitate being held by smaller hands, or the like.

Another example case 304 may have an antenna that causes the device 100 to display a graphical user interface or other graphical object that is coordinated with a physical feature in the case itself, such as an opening in the case. For example, the case 304 includes a front cover 316 that a user can open or close over the front of the device 100. The front cover 316 may include a window 318 that allows a portion of the display of the device 100 to be viewed when the front cover 316 is closed. When the device 100 detects that it is being used with the case 304 and that the front cover 316 is closed, it may transition from the first user interface 310 to another graphical user interface 320 that includes a graphical object 322 that is positioned so that the graphical object 322 is aligned with and/or visible through the window 318. The graphical object 322 as shown includes the current time and weather, though any other information or image may be included instead of or in addition to that shown. Further, the graphical object 322 may be remain displayed even when the front cover 316 is closed and after the display of the device 100 would otherwise have turned off (e.g., to save power). The device 100 may detect that the front cover 316 of the case 304 is closed using any suitable technique. For example, the device 100 may detect that the front cover 316 is closed by detecting that a front-facing camera has been occluded, using a second near-field wireless communication antenna in the front cover 316, or any other suitable technique.

Because the case 304 has a front cover 316, the device 100 may be more occluded or covered when it is in the case 304 than it would be in other, open-front cases (e.g., the case 300). Accordingly, when the device 100 detects that it is inside the case 304, it may change other settings or functions of the device as well. For example, it may increase an alert volume to account for the muffling or volume attenuation of the case 304. As another example, the device 100 may decrease an alert volume or turn off alerts entirely, as the user may use the case 304 when they intentionally want to silence the device 100. The device 100 may also change how it provides graphical or visual notifications, such as by displaying them in the area of the window 318 so that they are visible when the front cover 316 is closed. Indeed, as with any other accessory described herein, the user may customize how the device 100 changes in operation when it is used with an accessory. For example, the user may select what graphical user interface should replace the primary user interface (e.g., an array of application icons), what devices settings should change, and the like. While the case 304 is shown as having a front cover that can open and close, other types of cases may have windows and operate in a manner similar to the case 304 (e.g., a sleeve-type case with a window on one side of the sleeve).

Another example case 306 may be designed to hold the device 100 during exercise or other physical activity. The case 306, for example, includes a strap 326 for attaching the case 306 and device 100 to a user (e.g., to the user's arm or wrist). When the device 100 detects that it has been inserted into the case 306 (e.g., when the device 100 detects that it is close proximity to the antenna of the case 306), the device 100 may transition to a graphical user interface 324 that is tailored for use during exercise. For example, because devices such as smartphones are often used as audio players during exercise, the graphical user interface 324 may include large audio control buttons that are easy to see and press even during exercise (e.g., buttons that are responsive to touch inputs in an area about one square inch or greater). The device 100 may also suggest music or audio (e.g., a workout playlist) in response to detecting the case 306. The device 100 may also change a device setting to accept or respond to different types of inputs than it does in a normal operating mode. For example, the device 100 may be configured to skip a song when a user knocks on or bumps the device 100, and change a volume of an audio output when the user swipes the palm of their hand up or down along the front surface of the device. The device 100 may change its settings to respond to other types of inputs as well.

While FIG. 3A illustrates four example cases that may trigger device changes using a near-field wireless communication antenna, other types of cases may also be provided. For example, a case for use when camping, hiking, or other outdoor activities may be configured to cause the device 100 to enter a power-saving mode or change device settings to help conserve power (e.g., reducing screen brightness, turning off cellular radios and WIFI radios, or the like). Such a case may also replace a conventional lock screen or the primary graphical user interface with a set of icons for features or applications that are relevant to outdoor activities. For example, the device 100 may display large buttons to activate a flashlight function, a compass function, a map or positioning application, and a weather application. As noted above, the particular buttons that are displayed may be selected by a user based on his or her preferences when using that particular case.

As another example, a rugged case may be provided for when the device 100 is being used in work environments or during outdoor activities such as hiking, camping, fishing, boating, skiing, rock climbing, or the like. Such a case may be ruggedized or otherwise be configured to provide a greater degree of physical protection to the device, and may be configured to cause the device 100 to replace a conventional lock screen or the primary graphical user interface with a set of icons for features or applications that are relevant to a particular activity or work environment. For example, the device 100 may display buttons to activate a flashlight function, a level function, a camera application, and a walkie-talkie function. As noted above, the particular buttons that are displayed may be selected by a user based on his or her preferences when using that particular case.

As another example, a case may cause the device to change a background image or wallpaper to match or coordinate with a separate object. For example, a case may change a background image or wallpaper to match or coordinate with the fabric of a handbag, backpack, purse, or other object that the device and case are being used with. If the case is intended to be used when the device is being carried in a bag, backpack, or purse, the case may also cause the device to increase a ringer volume and/or a tactile notification amplitude to help a user hear or feel device notifications through the bag.

Figure 3B:
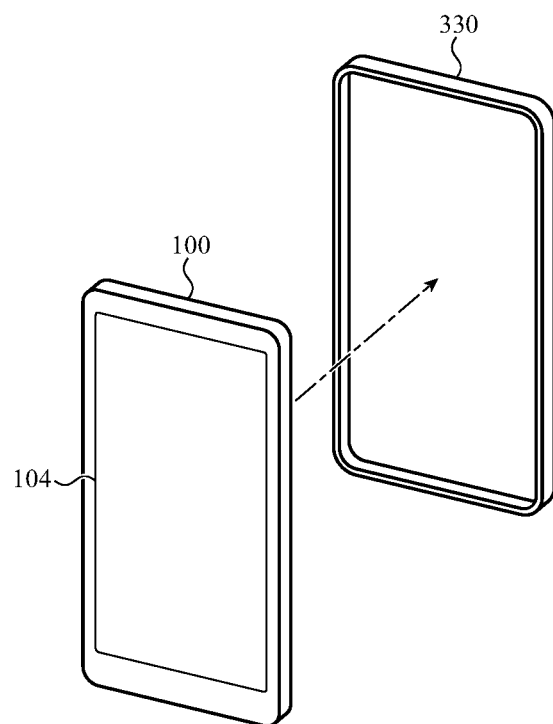
FIGS. 3B-3C depict the device of FIG. 1A being used with an example protective case.
Figure 3C:
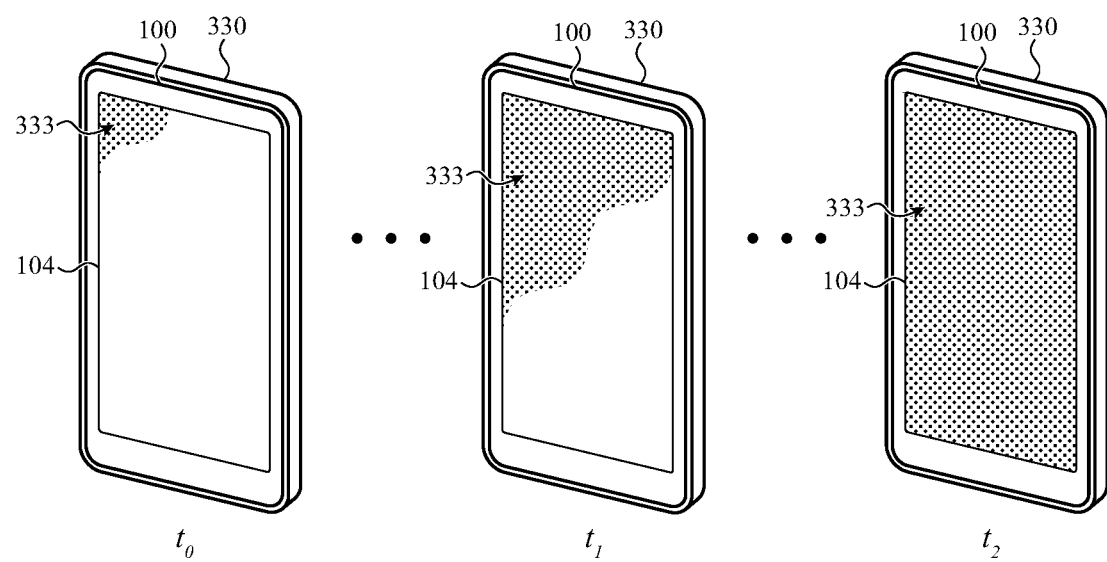

FIGS. 3B-3C illustrate an example of the device 100 being used with an accessory case 330, in which the device 100 displays, on its display 104, a color effect in response to being placed in a cavity 331 of a protective case 330. In particular, as described herein, the device 100 detects, with its near-field wireless communication system, that it is in close proximity to the case 330, and receives information about the case to determine what color effect to display.

FIG. 3C depicts an example color effect 333 that may be produced in response to the device 100 detecting that it is being used with the case 330. The color effect depicted in FIG. 3C may appear as a wash of color that sweeps across the display 104. The color effect 333 may be any visible change in a characteristic of the graphical output of the display 104. For example, if the display 104 is displaying a background image, the color effect 333 may be a change in the hue, tint, shade, tone, saturation, etc., of the background image. The color effect may also be an image, pattern, or the like. The color effect 333 may have a visual relevance to the color or use of the protective case 330. For example, the color effect 333 may match or be similar to the color of the case 330. As another example, the color effect 333 may have a contextual relevance to the use of the case, such as a ruggedized case for outdoor use causing the color effect 333 to have a camouflage appearance.

Returning to FIG. 3C, at time to, the color effect 333 may appear on the display 104. At time $t_1$, the color effect 333 (a border of the color change) has moved a distance across the display 104, and at time $t_2$, the color effect 333 has moved fully across the display 104. This may be the end of the color effect 333 (e.g., the color change persists until the device 100 is removed from the case or another event occurs), or the color effect 333 may continue with additional changes. For example, the "wash" of color may fade away or continue to move across the display 104 until it is gone and the original, unaltered graphical output (e.g., before time to) is once again displayed by the display 104. In cases where the color effect 333 (e.g., the change of color of the graphical output) persists until the device 100 is removed from the case 330, the color effect animation shown in FIG. 3C may be reversed in order to return the graphical output to the original, unaltered color (e.g., the color effect may animate from $t_2$ to $t_0$, instead of from to to $t_2$).

The color effect 333 shown in FIG. 3C may be displayed while other graphical objects or graphical user interfaces are being displayed by the display 104. For example, the display 104 may display icons associated with a main or primary user interface of an operating system of the device. The icons may appear to be in front of (or on top of) a background image. The color effect 333 may affect any portion or segment of the graphical output on the display 104. For example, the color effect 333 may result in visual changes to both the background image and the icons of a graphical user interface, or it may result in visual changes to the background image but not the icons of a graphical user interface, or to the icons but not the background image. The color effect 333 may also be displayed in conjunction with user interfaces other than the main or primary user interface. For example, the color effect 333 may be displayed while a graphical user interface of an application (e.g., a program that is executed by or on the operating system) is being displayed.

The graphical user output that is displayed when the color effect 333 is not present may be considered a different graphical output than that which is displayed when the color effect 333 is present. Stated another way, when the color effect 333 is not present, the device may be considered to be displaying a first graphical output, and when the color effect 333 is present (even transiently), the device may be considered to be displaying a second graphical output. These are merely examples of the ways in which a color effect 333 may affect the appearance of the graphical outputs on the display 104, and others are also contemplated.

FIG. 3D illustrates an example of the device 100 being used with an accessory case 334, in which the device 100 displays a graphical output that is coordinated with a physical feature in the case 334 itself, such as an opening in the case. For example, similar to the case 304, the case 334 defines a window 336 that allows a portion of the display 104 of the device 100 to be viewed when the device 100 is in the case 334. When the device 100 detects that it is being used with the case 334 (e.g., using the near-field wireless techniques described herein), the device 100 may transition from displaying a first graphical output 337 (which may be main or primary graphical user interface, a graphical user interface of an application, or the like) to displaying another graphical output, such as a graphical object that is aligned with and/or visible through the window 336.

The case 334 may define an opening 335 along a side of the case 334 to allow the device 100 to be slid into the case 334. The opening 335 may be the only opening that is configured to allow the device to be put into the case 334. While the opening 335 is shown on the side of the case 334 that has the smallest area, the opening 335 may be along a different side of the case 334 in other implementations (e.g., a long side 377) of the case 334.

FIG. 3E illustrates the device 100 inserted into the case 334. Once the device 100 detects that it has been inserted into the case 334 or is otherwise being used with the case 334, (e.g., with near-field wireless techniques), the device 100 transitions from displaying the first graphical output 337 (e.g., a primary graphical user interface) to displaying a second graphical output 344. The second graphical output 344 is different than the first graphical output 337, and, as shown, includes a graphical object having a size, shape, and position on the display 104 that coordinates with the window 336. Notably, the graphical object of the second graphical output 344 may appear out-of-place or may impede the display of the main graphical user interface if the device 100 were not in the case 334. The second graphical output 344 as shown includes the current time 376, a message notification icon 338, and a call notification icon 339, though any other types of icons or information may be included. The message and call notification icons may also include a number of unread or recent messages or calls, thus enabling a user to quickly access information that might be useful to see without having to remove the device 100 from the case 334.

FIG. 3F illustrates the device 100 inserted into the case 334, with the device 100 displaying a third graphical output 345. The third graphical output 345 may include a graphical object that is used in place of the second graphical output 344. The particular content, arrangement, appearance, or other property of the graphical object(s) displayed in the window 336 may be user selectable or configurable. For example, a user of the device 100 may select whether the second or third graphical output 344, 345 is displayed when the device 100 is inserted into the case 334. The third graphical output 345 may include the current time 340, a weather indicator 393 (which may display a graphical depiction of the current weather), a day/date indicator 342, and a notification indicator. The notification indicator may signal that a new notification is available for the user. The notification may indicate, for example, that an event has occurred on the device 100 (e.g., a voice message has been received, an incoming call was missed, an application has issued a notification or message, a text or email message has been received, etc.). The content of the third graphical output 345 may be configured to convey information more succinctly and efficiently than a conventional graphical user interface. For example, instead of indicators that differentiate between different types and amounts of recently received messages, the graphical output 345 includes the notification indicator 341 that relates to multiple different kinds of messages. This type of streamlined graphical output may improve the functionality of the device 100 by allowing the user to interact with the device in different ways under different circumstances or use cases. For example, instead of requiring a user to remove the device 100 to check for messages or to see the time, the user can simply glance at the device 100 through the window 336 to see the desired information. Further, while the same information may also be displayed in a main or primary user interface, the main or primary interface may show the information in smaller or less easily-viewable forms. As such, displaying the information in a more efficient, readable form improves the overall usability of the device and the usefulness of the device 100 when it is in the case 334.

As noted above, various types of accessories may be configured to use near-field wireless communication systems to affect the operational modes and/or characteristics of devices that are using those accessories. FIGS. 3A-3F, for example, illustrate examples where the accessory is a protective case for a device. Another type of accessory may be configured to mount to the device and/or a protective case of the device (e.g., on a back surface of the device or case). FIGS. 3G-3I illustrate one such example accessory.

FIG. 3G depicts a device 346 (which may be in a protective case) and a card wallet accessory 347 that is configured to be removably attached to a surface 351 (e.g., a back surface) of the device 346. The device 346 may be or may be an embodiment of the device 100, and may be the same as or similar to the device 100.

The card wallet accessory 347 may include a near-field wireless communication antenna 348 that is detectable by the near-field wireless communication system of the device 346. The card wallet accessory 347 may define a first opening 358 that is configured to allow an object (e.g., a bank card 350) to be placed into and removed from an internal cavity of the card wallet accessory 347. The card wallet accessory 347 may also define a second opening 349, which may allow the contents of the card wallet accessory 347 to be visible to a user and may also allow the user to touch the contents of the card wallet accessory 347 in order to slide the contents out of the card wallet accessory 347. The card wallet accessory 347 may also include magnetic attachment features 359 that are configured to removably attach the card wallet accessory 347 to the device 346 via complementary magnetic attachment features 360 of the device 346. The magnetic attachment features 359, 360 may include magnets, ferromagnetic materials, or the like. In some cases, the device 346 may include a metal plate or sheet so that the card wallet accessory 347 may be positioned anywhere along the surface 351.

FIG. 3H shows the card wallet accessory 347 removably attached to the surface 351 of the device 346. As described for other near-field wireless enabled accessories, in response to detecting that the card wallet accessory 347 has been attached to the device 346, the device 346 may take an action or change a mode of operation. In the case of attaching the card wallet accessory 347, the device 346 may log a location of the device when the card wallet accessory 347 was attached, or display a graphical object (e.g., a notification object that overlies a portion of a graphical user interface) acknowledging that the card wallet accessory 347 has been attached. In some cases, instead of or in addition to detecting the card wallet accessory 347, the device 346 may detect the contents of the card wallet accessory 347. For example, a bank card may include a near-field wireless communications antenna that the device 346 can detect. In such cases, in response to detecting that the card wallet accessory 347 has been attached, the device 346 may determine the identify of any near-field wireless enabled cards in the card wallet accessory 347 and provide an indication to the user of the contents. As a particular example, a name, icon, or other indicator of each card in the card wallet accessory 347 may be displayed on the device's display so that a user can easily see what cards are available just by viewing the display.

In the case where the device 346 can detect the presence or proximity of cards or other objects in the card wallet accessory 347, it can also take certain actions in response to detecting that a card has been removed from the card wallet accessory 347. FIG. 3I illustrates an example in which a bank card 350 has been removed from the card wallet accessory 347. In response to detecting the removal, the device 346 displays one or more graphical objects that are relevant or related to the removed card 350. For example, the device 346 may display a first graphical object 352, which may be an image of the particular bank card 350 that was removed. The device 346 may also display a second graphical object 353, which may be a recent purchase history associated with the bank card 350. Other types of information and/or graphical objects may be displayed instead of or in addition to those shown in FIG. 3I.

In other cases, the device 346 may take other actions, initiate other applications, or display other types of graphical objects in response to detecting that a card (or the card wallet accessory 347) has been removed from the device 346. For example, the device 346 may launch a wallet application or a finance application. As another example, the device 346 may open an application based on the location of the device 346 when the card is removed. More particularly, because the removal of the bank card 350 may indicate that the user is about to make a purchase, the device 346 may determine if its location at that time corresponds to a store and may open an application associated with that store. As yet another example, the device 346 may determine if there are any available coupons, deals, rewards, or other offers that are associated with stores near the user when the card is removed. As yet another example, the device 346 may associate a geographical location with the removal event, as described herein with respect to FIG. 3O-3P.

FIGS. 3J-3L illustrate another example accessory that is configured to mount to a device and/or a protective case of the device (e.g., on a back surface of the device or case). In particular, FIGS. 3J-3L depict a device 354 (which may be in a protective case) and a battery accessory 355 that is configured to be removably attached to a surface 357 (e.g., a back surface) of the device 354. The device 354 may be or may be an embodiment of the device 100, and may be the same as or similar to the device 100.

The battery accessory 355 may include a near-field wireless communication antenna 356 that is detectable by the near-field wireless communication system of the device 354. The battery accessory 355 may be configured to charge a battery of the device 354 and/or otherwise provide power to the device 354. The battery accessory 355 may provide power to the device 354 via a cable, or it may include a wireless charging system comprising an output coil configured to inductively couple to a charging coil of the electronic device 354 when the battery accessory 355 is removably attached to the device 354.

The battery accessory 355 may also include magnetic attachment features 362 that are configured to removably attach the battery accessory 355 to the device 354 via complementary magnetic attachment features 363 of the device 354. The magnetic attachment features 362, 363 may include magnets, ferromagnetic materials, or the like. The magnetic attachment features 362, 363 and the charging coils of the battery accessory 355 and the device 354 may be embodiments of the corresponding components described with respect to FIGS. 2A-2B.

FIG. 3K shows the battery accessory 355 removably attached to the surface 357 of the device 354. As described for other near-field wireless enabled accessories, in response to detecting that the battery accessory 355 has been attached to the device 354, the device 354 may take an action or change a mode of operation. In the case of attaching the battery accessory 355, the device 354 display a graphical object (e.g., a notification object) providing information about the battery accessory 355 and/or its operation with respect to the device 354.

FIG. 3L, for example, illustrates an example graphical object 364 that may be displayed by the device 354 in response to the device 354 detecting that the battery accessory 355 has been attached to the device 354. The graphical object 364 may be displayed as a box that overlies another graphical user interface, application, or the like, and may disappear after a certain time or be dismissed by the user. The graphical object 364 may display information such as a battery charge level of the battery accessory 355 and an estimated time it will take for the battery accessory 355 to fully charge the device 354 (as shown in FIG. 3L). Other information may also be displayed, such as a name or nickname of the battery, a name of an owner of the battery, a battery health of the battery accessory 355, a predicted charge level of the device 354 if the battery accessory 355 remains on the device 354 for a certain period of time (e.g., 1 hour=60% charge; 2 hours=100%), or any other suitable information.

The device 354 may also initiate actions in response to detecting the removal of the battery accessory 355. For example, the device 354 may display a graphical object (which may be similar in appearance and function to the graphical object 364, and may include a remaining charge of the battery accessory 355, an amount of charging time that the battery accessory 355 will require for a full charge. As another example, the device 354 may associate a geographical location with the removal event, as described herein with respect to FIG. 3O-3P.

Figure 3M:
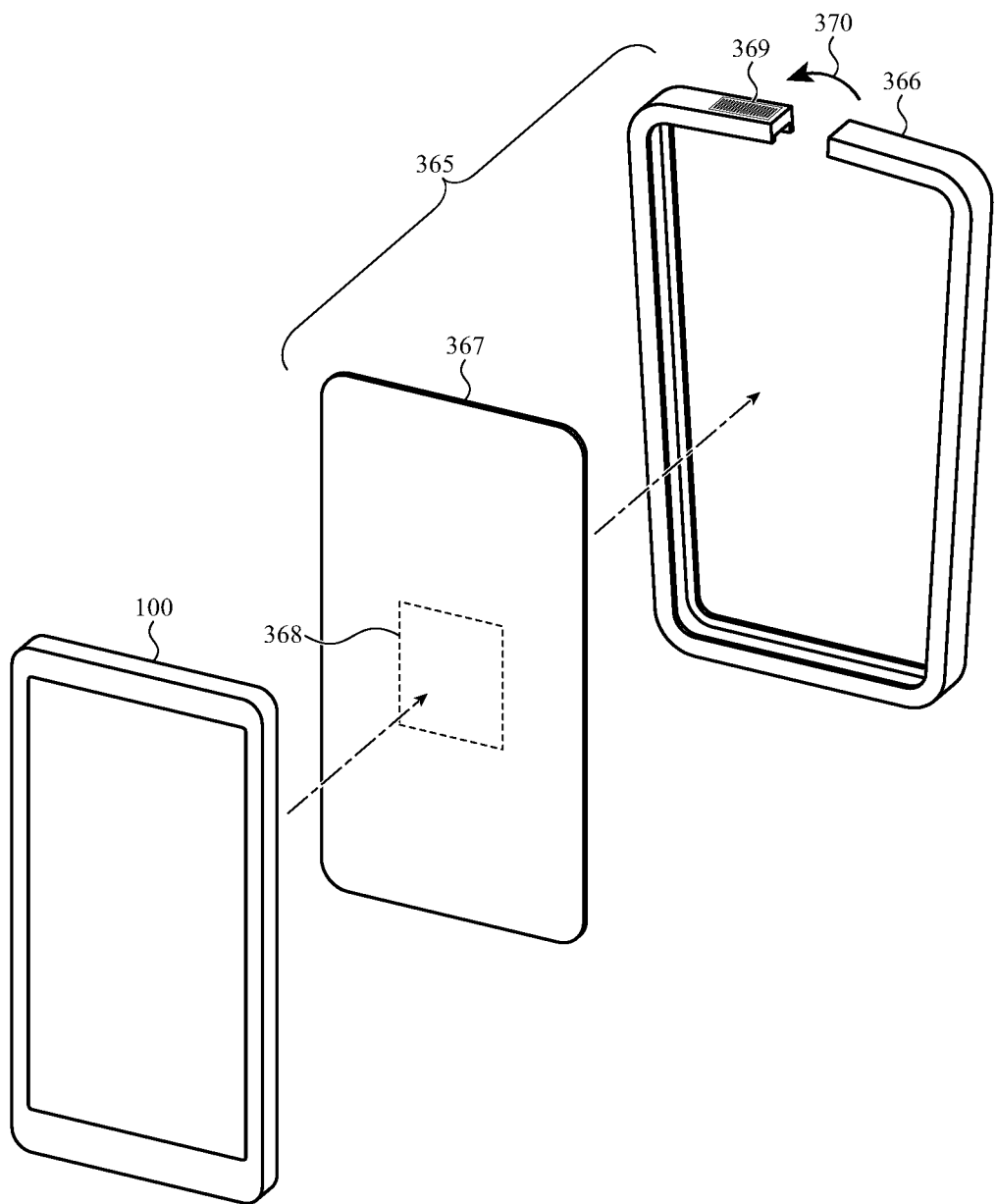
FIGS. 3M-3N depict the device of FIG. 1A being used with another example protective case.
Figure 3N:
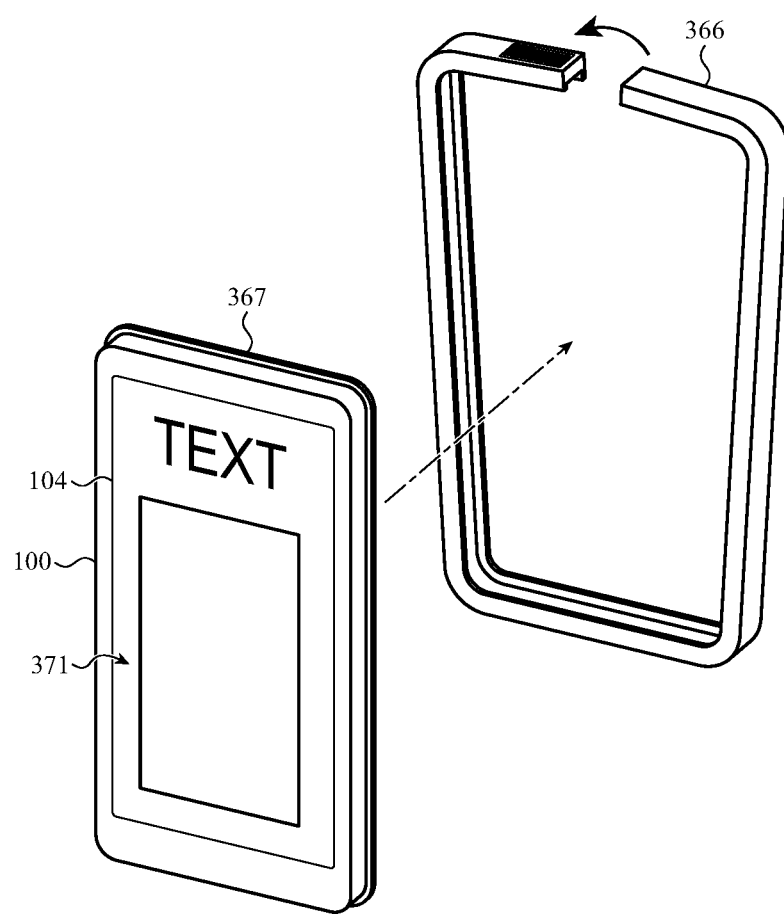

FIGS. 3M-3N illustrate an example in which a device detecting a particular type of case may cause the device to display information relevant to that case. For example, as shown in FIGS. 3M-3N, a case 365 may include multiple pieces or components that need to be assembled in a particular way in order to secure the case to the device. Accordingly, the case 365 may include a near-field wireless communication antenna so that the device can detect when the case 365 is being used and provide assembly instructions and/or other information to the user.

As shown in FIG. 3M, the case 365 includes a back member 367 and a peripheral member 366. The back member 367 is configured to cover and protect the back of the device 100, while the peripheral member 366 protects the sides of the device and holds the back member 367, the device 100, and the peripheral member 366 together. The back member 367 may include a near-field wireless antenna 368 that is detectable by the device 100, as described herein. The peripheral member 366 may have a seam or discontinuity to allow the peripheral member 366 to expand to accept the device 100 and the back member 367. To secure the case 365, the peripheral member 366 may be closed by closing the seam or discontinuity as indicated by arrow 370. The peripheral member 366 may also include a latch member 369 that secures the peripheral member 366 in the closed configuration.

FIG. 3N illustrates the case 365 in an initial stage of assembly. In particular, the device 100 may be placed on the back member 367, which may result in the near-field wireless communication antenna 368 of the back member 367 being detected by the near-field wireless communication system of the device 100, which in turn causes a graphical output 371 to be displayed on the display 104 of the device 100. The graphical output 371 may include any suitable text and/or graphical content. In some implementations, the graphical output 371 includes assembly instructions for the case 365. For example, the graphical output 371 may illustrate how to close the seam and secure the latch member 369 to lock the peripheral member 366 around the back member 367 and the device 100. In some cases, the latch member 369 may include a near-field wireless communication antenna, and the device 100 may be able to detect when the latch member 369 is in a latched or secured position. In response to detecting that the latch member 369 is in the latched or secured position, the device 100 may display a graphical object indicating to the user that the case has been properly and/or completely assembled.

Instead of or in addition to displaying assembly instructions, the device 100 may display other graphical objects or graphical user interfaces, or otherwise change its mode of operation, in response to detecting that it is being used with the case 365. For example, the case 365 may be a ruggedized case that is intended for use during outdoor recreational activities. Accordingly, the device 100 may initialize a fitness application, GPS application, or other application that reflects a probable upcoming activity of the user. As described above, the device 100 may use other sensors or information to determine what (if any) applications or operational modes to initiate while the device 100 is in the case 365. For example, if the device 100 detects that the ruggedized case 365 is being attached to the device 100 proximate a trailhead, the device 100 may initiate an application associated with hiking (e.g., a GPS application, a fitness tracking application, or the like). If the device 100 detects that the ruggedized case 365 is being attached to the device 100 proximate a downhill ski facility, the device 100 may initiate an application associated with skiing (e.g., a ski tracking application, a map of the ski facility, or the like).

Figure 3O:
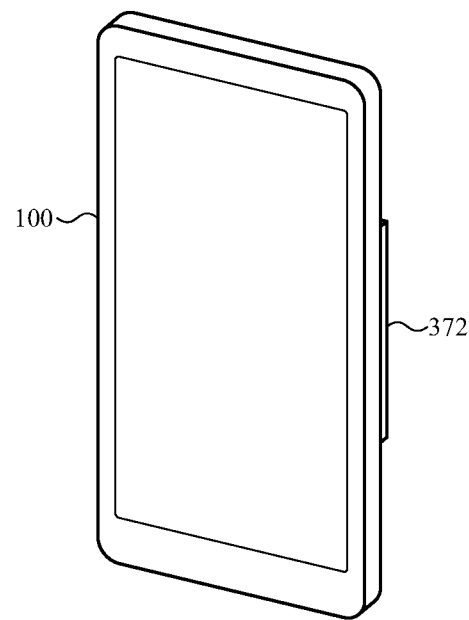
FIGS. 3O-3P depict the device of FIG. 1A being used with another example removable accessory.
Figure 3P:
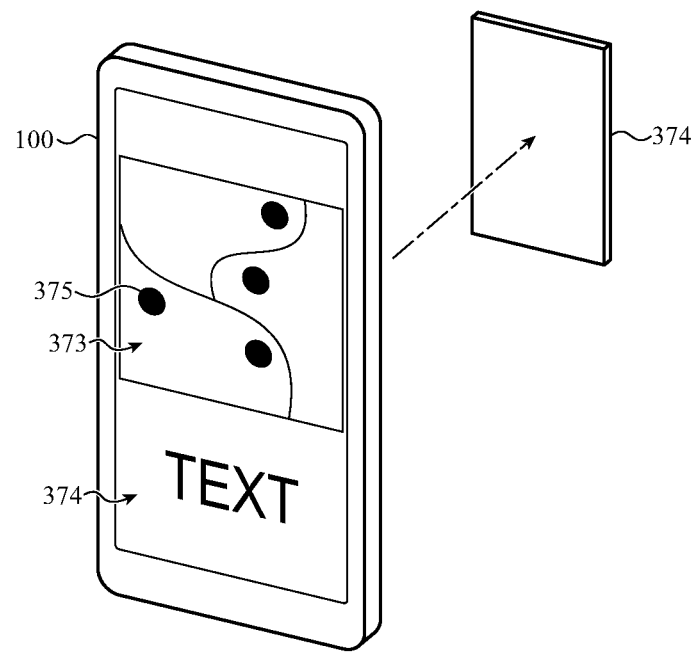

As described above with respect to the card wallet accessory and the battery accessory, a device may take certain actions upon detecting the removal of an accessory from the device (or upon removal of the device from a case, dock, or any other accessory). For example, the device may log the location of the device when the accessory was removed. This information may be helpful for alerting the user to unintended detachments of accessories and finding lost accessories. FIGS. 3O-3P depict a device 100 being used with an accessory 372 (which may represent the card wallet accessory 347, the battery accessory 355, or any other near-field wireless enabled accessory).

FIG. 3O shows the accessory 372 and the device 100 attached. When the accessory 372 is removed from the device 100 (or the device 100 and accessory 372 are decoupled), the device 100 may detect the removal by detecting the absence of the near-field wireless antenna of the accessory 372. In response to detecting the removal of the accessory 372, the device 100 may save information about the removal event. For example, the device 100 may determine the location of the device at the time of the removal of the accessory 372, and a time of the removal of the accessory 372. In some cases, the device 100 will display this (or other) information to the user upon removal. For example, as shown in FIG. 3P, the device 100 may display a map 373 with a graphical indicator 375 representing the location where the accessory 372 and the device 100 were separated. The device 100 may also display textual information 374. In some implementations, the textual information 374 provides text indicating the location (e.g., an address, latitude/longitude coordinates, or the like), the time of removal, and optionally other information.

The information about the removal of the accessory 372 may be displayed to the user substantially immediately after detecting the removal event, or it may not be displayed and instead be logged for later retrieval and/or viewing by the user. In either case, the information may be stored so that the user can retrieve and view the information as needed.

Figure 4:
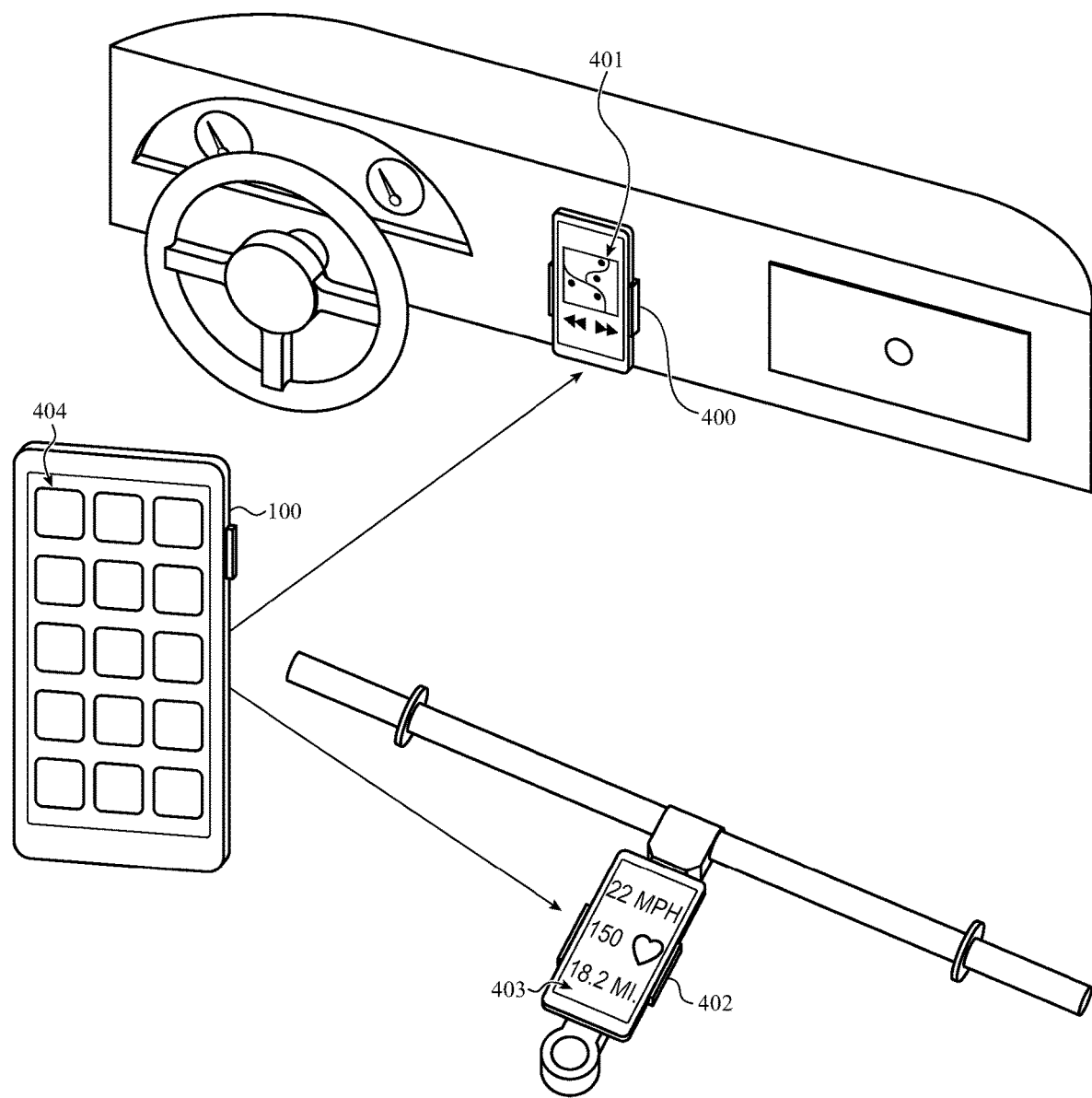
FIG. 4 depicts several additional example devices holders for the device of FIG. 1A.

FIGS. 3A-3P show examples of protective cases and other accessories that use a passive antenna to change an operational mode of an electronic device when used with the device. Similar principles may apply to device holders that are configured to hold or support a device during an activity. FIG. 4 illustrates two examples of device holders or docks that may include near-field wireless communication antennas to change the operational mode of the device 100.

FIG. 4 illustrates the device 100 while displaying a first graphical user interface 404, which may be the primary graphical user interface of the device 100, such as graphical user interface 128 (FIG. 1B). FIG. 4 also shows the device 100 mounted to a dock 400 in a car. The dock 400 may include a near-field wireless communication antenna that causes the device 100 to switch from displaying the first graphical user interface 404 to displaying a second graphical user interface 401 that is tailored for use while driving (e.g., the device may cease displaying the first graphical user interface and begin displaying the second graphical user interface). As with the other accessories described herein, the transition may be automatic and seamless to the user— simply placing the device in the dock 400 (e.g., so that the device is positioned on or held by the dock) may cause the device 100 to transition to the car-specific graphical user interface.

The graphical user interface 401 may include audio controls that are large and easy to see and touch while the user is driving. The graphical user interface 401 may also include a map or navigation view. In some cases, the graphical user interface 401 may include large, easy to read icons for various different applications or functions (e.g., radio, telephone, map, messages, etc.). The device 100 may also change other device settings as a result of detecting that it has been mounted to the dock 400. For example, the device 100 may enter a "do not disturb" mode that may reduce the possibility of distraction while driving. This may turn off message notifications (e.g., text messages, emails, application notifications, etc.) so that the user is not tempted to type responses or read text-based messages while driving.

FIG. 4 also illustrates the device 100 mounted to a dock 402 on a bicycle. The dock 402 may include a near-field wireless communication antenna that causes the device 100 to cease displaying the first graphical user interface 404 and instead display a second graphical user interface 403 that is tailored for use while cycling. For example, the graphical user interface 403 is displaying a speed, a heart rate, and a distance travelled. In some cases, placing the device 100 in the bike-mounted dock 402 may cause the device 100 to initiate an application, such as an activity tracking application, a biometric monitoring application (e.g., a heart-rate monitor), a map or positioning application (e.g., a GPS application), or the like. In some cases, placing the device 100 in the bike-mounted dock 402 (or other exercise-related dock or accessory, such as a dock on a running stroller or stationary bike, or arm-mounted carrying case) causes the device 100 to display an affordance that, when selected by a user, causes the device to begin recording a workout associated with the exercise equipment associated with the dock (e.g., an outdoor bike ride, a run, an indoor bike ride). As another example, placing the device 100 in the bike-mounted dock 402 (or other exercise-related dock or accessory) causes the device 100 to display a list of multiple affordances (e.g., outdoor bike ride, indoor bike ride, outdoor run, etc.) from which a user may select to initiate a workout recording.

Accordingly, the graphical user interface 403 may be the graphical user interface of that particular application. In some cases, the graphical user interface 403 does not correspond to any single application, but instead displays outputs from various different applications or functions that are being executed by the device. For example, the speed output and the distance travelled may be provided by a GPS or cycling-specific application, while the heart rate output is provided by a biometric monitoring function or application. The graphical user interface 403 may use the data from these applications without executing or displaying the dedicated graphical user interfaces of those applications.

While the graphical user interface 403 is shown as having only outputs, it may also or instead include selectable inputs, such as audio controls that are large and easy to see and touch while the user is riding, large icons for various different applications or functions (e.g., radio, telephone, map, messages, etc.). The device 100 may also change other device settings as a result of detecting that it has been mounted to the dock 402. For example, the device 100 may enter a "do not disturb" mode that may reduce the possibility of distraction while cycling. This may turn off (or mute) message notifications (e.g., text messages, emails, application notifications, etc.) so that the user is not tempted to type responses or read text-based messages while cycling. In some implementations, when the device 100 is being used with other docks and/or accessories, such as home-based docks, protective cases, charging docks, wallet accessories, auxiliary batter accessories, etc., message notifications are not turned off or muted (e.g., they are displayed or otherwise provided to the user).

The device 100 may be mounted to other types of docks. For example, the device 100 may be mounted to docks that are integrated with or otherwise associated with exercise equipment such as stationary bicycles, rowing machines, elliptical machines, stair-climbing machines, or the like. When mounted to exercise equipment, the device 100 may detect the type of exercise equipment it is mounted to and initiate a coaching application or service that is relevant to that particular equipment. The device 100 may also use additional information to determine what type of coaching application or service to use, or whether to display a user interface that does not include a coaching service or interface. For example, the device 100 may use the device's location to determine if it is mounted to the user's home stationary bike or a stationary bike at a fitness studio. If it is mounted to the home stationary bike, the device 100 may initiate a coaching application or service, and if it is mounted to a bike at a fitness studio, the device may not initiate the coaching application (reflecting the fact that the fitness studio may have live coaches, for example).

The accessories shown in FIGS. 3A-4 may have features and physical characteristics that make them suited to certain uses. For example, a ruggedized case may be targeted for rough work environments, and a sport case may have straps so the case can be worn during workouts. While these accessories may cause a device to change its operation using near-field wireless communication systems, they do not communicate with or interact with the device 100 in other ways. However, accessories that use near-field wireless communication systems may also have other components, systems, or mechanisms that interact or communicate with the device 100 to expand the functionality of the accessory and/or the device 100.

Figure 5:
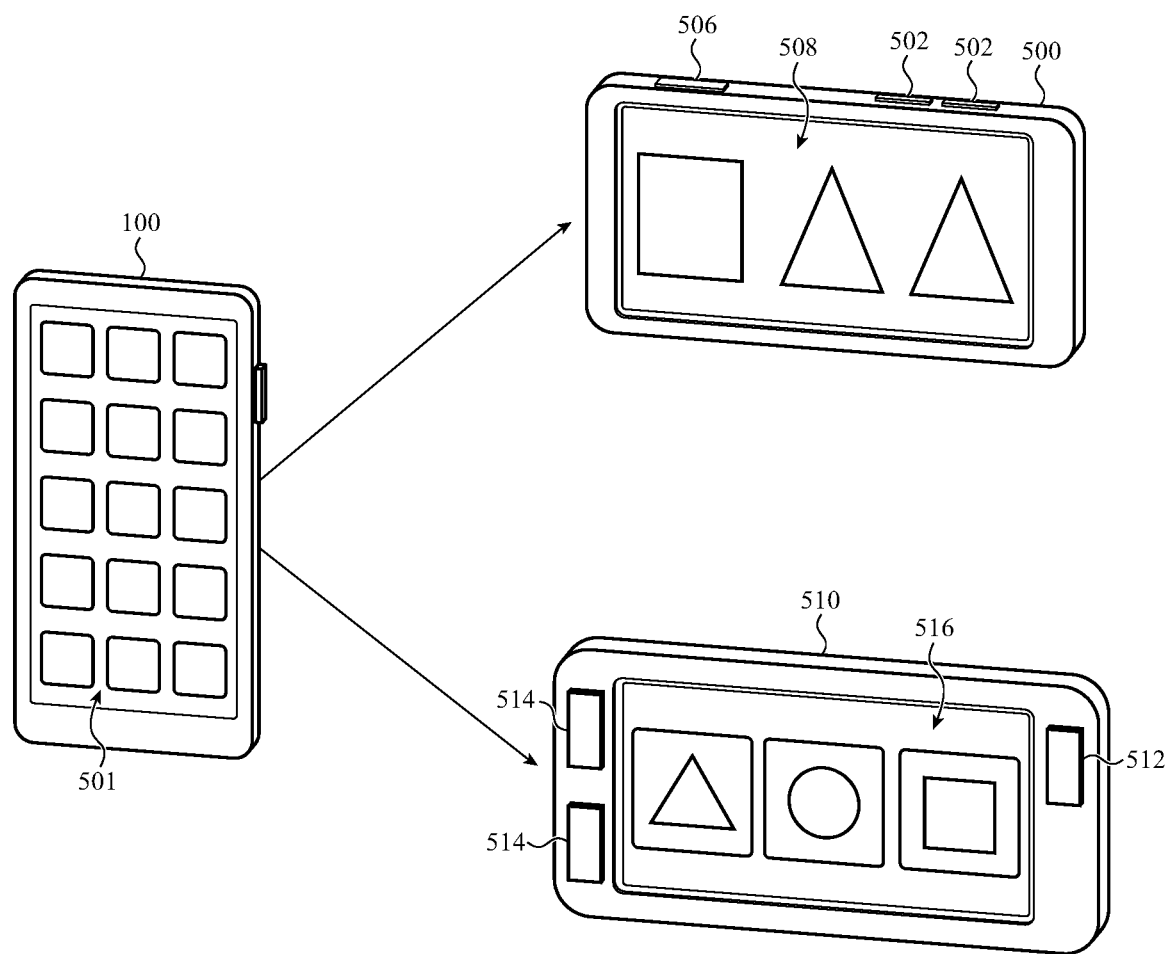
FIG. 5 depicts several additional example protective cases for the device of FIG. 1A.

FIG. 5 illustrates two examples of protective cases that use near-field wireless communications to cause the device 100 to change its mode of operation and also include input systems that wirelessly communicate with the device 100 and provide auxiliary inputs for a user. For example, FIG. 5 shows the device 100 not attached to an accessory or inserted in a case, and displaying a first graphical user interface 501, which may be the primary graphical user interface of the device 100, such as graphical user interface 128 (FIG. 1B). FIG. 5 also shows the device 100 after it has been inserted into a camera case 500. Similar to the other protective cases described herein, the camera case 500 may include a near-field wireless communication antenna that causes the device 100 to cease displaying its first graphical user interface and replace it with a second graphical user interface. In this case, because the case 500 is configured to facilitate the use of the device's camera functions, the second graphical user interface may be an image-capture interface 508. The image-capture interface 508 may include a preview of the scene at which the device's camera is aimed, as well as other selectable regions or input areas for controlling aspects of the camera functions (e.g., flash settings, aperture, shutter speed, white balance, image-capture type (e.g., video mode, still image mode, slow-motion mode), self-timer settings, shutter button, front/back camera selector, or the like. The device 100 may transition from the first graphical user interface 501 to the media-capture interface 508 (e.g., a still image capture user interface or a video capture user interface) when the device 100 is inserted into the camera case 500, or if the device's display is off when the device 100 is inserted into the camera case 500, the display may automatically turn on and immediately display the image-capture interface 508.

The camera case 500 may also include auxiliary input systems, such as buttons 502, that are configured to control image-capture functions of the device 100. For example, one of the buttons 502 may act as a shutter button to capture an image or begin or end a video recording. As another example, the buttons 502 may control zoom functions, aperture settings, shutter speed, or any other image-capture functions. The camera case 500 may also have a button mechanism 506 that allows a user to actuate a button of the device 100 itself. For example, the button mechanism 506 may include a movable button member (or membrane or material) that transfers force from a user's finger to the button 108 of the device 100 (FIG. 1A) to mechanically actuate the button 108. In some cases, when the device 100 is inserted into the camera case 500, the detection of the near-field wireless communication antenna of the camera case 500 causes the device 100 to re-map the input from the button 108 from a first function, such as locking the phone and/or deactivating the display, to a second function, such as a shutter button. This re-mapping may occur whenever the device 100 is in the camera case 500 and the device 100 is in an image-capture mode. That is, a user may leave an image-capture mode (and thus leave the image-capture interface 508) and use the device 100 in other modes (e.g., using the primary graphical user interface 501) while the device 100 remains in the camera case 500. Under such circumstances, the device may revert the button 108 to a default function, and may re-map the buttons 502 to other functions. When the user re-initializes the image-capture interface, the device 100 may once again use the buttons 108, 502 to control aspects of the image-capture functions of the device 100.

Actuation signals from the buttons 502 may be detected by the device 100 in various ways. In some cases, the buttons 502 use near-field wireless communication techniques to provide inputs to the device 100. For example, the buttons 502 (or any other type of input system) may include an actuation member configured to be actuated by a user. The actuation member may be any component that is actuated by a user, such as rigid button member, a membrane, or the like. The buttons 502 may further include a passive antenna, such as a near-field wireless communication antenna. When the actuation member is actuated by the user (e.g., pressed), the buttons 502 may cause the near-field wireless communication antenna to become detectable by the electronic device. For example, when the buttons 502 are in an unactuated state, the near-field wireless communication antenna may be in a state or configuration that causes the antenna to not detectable by the device 100. This may be caused by the antenna being electrically decoupled from other circuit elements, grounded, electrically coupled to other circuit elements, or otherwise put into a state where the near-field wireless communication system of the device 100 does not (and/or cannot) detect the antenna. In response to the actuation member being actuated by the user, the passive antenna may become detectable by the electronic device. More particularly, the user actuating the actuation member (e.g., by pressing it with a finger or other object) may change the electrical configuration of the antenna and/or associated circuitry in a manner that makes the antenna detectable by the device. For example, pressing the actuation member may cause an electrical contact to close, thereby connecting the antenna to a circuit element (e.g., a capacitor, an inductor, a resistor, etc.) to make the antenna detectable by the near-field wireless communication system of the device 100. In another example, pressing the actuation member may cause an electrical contact to open, thereby decoupling the antenna to an electrical ground. Other techniques may also be used to cause the antenna to switch between a detectable state and an undetectable state. Further, other techniques may be used to wirelessly communicate actuation signals from the buttons 502 to the device 100, such as other wireless communication protocols (e.g., Bluetooth, WIFI), acoustic signals (e.g., audible, ultrasonic), light, or the like.

The device 100 may be configured to execute an operation in response to detecting the passive antenna with the device's near-field wireless communication system. For example, when the user presses or actuates one of the buttons 502, the antenna associated with the button may be detected by the near-field wireless communication system of the device 100. The antenna may communicate some information to the device 100 that causes the device to perform a function such as capture an image, zoom in or out on a scene or subject, change a camera setting (e.g., aperture, shutter speed), or the like. The information communicated to the device 100 by the antenna may be a command to execute a particular function, an identifier that the device 100 uses to lookup an associated function or command, or any other suitable information.

Because the camera case 500 may include auxiliary inputs (or may otherwise cause a user to operate the camera function differently than when the device 100 is not in the camera case 500), the image-capture interface 508 may be different than an image-capture interface that is displayed when the device 100 is not used with the camera case 500. For example, a default image-capture interface for use without the camera case 500 may include selectable shutter button objects and other setting controls on the display of the device. Because the camera case 500 may include physical buttons to control these functions, in some implementations separate display-based controls for the functions are omitted from the image-capture interface 508 (while in other implementations, display-based controls for the functions are displayed on the image-capture interface 508, such that the user can use the display-based controls and/or the physical buttons. The image-capture interface 508 may differ from a default image-capture interface in other ways as well. The image capture interface 508 is shown displaying shapes, though the shapes represent a live preview of the camera (e.g., the image the camera will capture when an image capture command (e.g., shutter button) is received).

Gaming case 510 is another example case that may use a near-field wireless communication antenna to cause a device to change to an operating mode that is contextually relevant to the intended use of case, and also use near-field wireless communication systems to provide auxiliary inputs that are contextually relevant to the intended use of the case. For example, the gaming case 510 may have a near-field wireless communication antenna that causes the device 100 to enter a gaming mode, which may include transitioning from a first graphical user interface to a gaming graphical user interface 516. In some implementations, the gaming graphical user interface 516 is a selection screen of gaming applications (represented by the application icons with the triangle, circle, and square shapes) that a user may select, though the gaming graphical user interface 516 may be any other type of interface. For example, attaching the gaming case 510 to the device 100 may cause the device 100 to launch a single gaming application (which may be selected by the user), thereby causing that game's dedicated graphical user interface to appear.

Like the camera case 500, the gaming case 510 may include auxiliary inputs 512, 514 that use near-field wireless communication antennas to signal input events to the device 100. In some implementations, the auxiliary input 512 is a directional pad (e.g., a generally plus-shaped input member that can be used to provide directional inputs), a joystick, an analog controller, or the like. In some implementations, the auxiliary inputs 514 are buttons. The auxiliary inputs 512, 514 may use the same or similar techniques as the buttons 502 to activate and/or deactivate near-field wireless communication antennas.

The device 100 may be configured to dynamically re-map the auxiliary inputs 512, 514 based on the game, application, operating mode, or graphical user interface that is active on the device 100. For example, when the user places the device 100 into the gaming case 510, the device 100 may enter a gaming mode or graphical user interface, and the auxiliary inputs 512, 514 may be mapped to gaming inputs (e.g., to control a character or other aspect of a game). If the user exits the gaming mode while the device 100 is still in the gaming case 510, the auxiliary inputs 512, 514 may be re-mapped to other functions. For example, the directional pad 512 may control the position of a cursor on the display or change a selected object, and the buttons 514 may select items, launch applications, switch the device between different applications or user interfaces, or the like. When the user returns to the gaming mode, the auxiliary inputs 512, 514 may be re-mapped to the gaming functions.

While several examples of protective cases are described above, these are merely some of the numerous types of accessories, and associated changes to the operating mode of the device, that may use near-field wireless communication techniques to automatically customize the operation of a device. As one example of another accessory, a protective case may include a keyboard that wirelessly communicates with the device. When the device 100 is positioned in the case with the keyboard, the device 100 may change a setting so that an on-screen keyboard is not displayed when text input fields are selected or available, and so that inputs from the case's keyboard are used for text input. The device 100 may change its mode of operation in other ways, including changing an auto-correct model and/or algorithm (e.g., from one that is tailored to touch-screen based inputs to one that is tailored for physical key inputs from the keyboard), changing sound and/or tactile outputs associated with key presses, and the like. The device 100 may also initiate a pairing sequence or otherwise initialize wireless communication with the keyboard upon detecting the keyboard case. The keyboard may communicate with the device using any suitable communication technique or protocol, including wireless communications such as WIFI, Bluetooth, near-field wireless communications, or the like. In some implementations, the keyboard communicates with the device via a direct physical connection (e.g., a wired connection). In some cases, the keyboard may be associated with a keyboard dock or stand-alone keyboard instead of a protective case. In such cases, the near-field wireless communication system of the device 100 may detect when the device 100 is docked on the keyboard or otherwise in proximity to the keyboard.

Another example protective case may include a battery that may recharge the device 100 (either via physical connectors or wirelessly) when the device 100 is in the case. Upon the device 100 being inserted into the case or otherwise used with the battery, the device 100 may display a notification indicating that a battery has been attached and optionally providing selectable inputs to control aspects of a charging function (as shown with respect to FIG. 2A). The device 100 may also record the location of the device 100 when the battery-enabled protective case was attached to or removed from the device 100.

Accessories need not be protective cases that enclose or cover the device 100. For example, a card-holder or wallet-type accessory may be configured to attach to a device (or to a protective case), and the device 100 may use its near-field wireless communication system to detect when the card-holder accessory is attached to and removed from the device. The device 100 may customize a graphical user interface in response to detecting that the card-holder accessory has been attached (e.g., changing a background color or image of a primary graphical user interface to match a color of the accessory, or changing a color scheme or background of a graphical user interface of a digital wallet application to match the card-holder accessory). The device 100 may also use the near-field wireless communication system to help a user identify when and where the card-holder accessory is removed from the device. For example, upon the device 100 detecting that the card-holder accessory has been removed from the device 100, the device 100 may record the current time and the location of the device 100 (e.g., from a GPS or other positioning system). This information may then be provided to a user to help the user locate the card-holder accessory or at least know when and where the card-holder accessory was lost or removed. For example, a notification may be provided on the display of the device that shows the time and location (e.g., on a map) when the accessory was removed from the device 100.

Some accessories, such as some of the cases described above, may be configured to cause the device 100 to enter a particular operating mode or initiate a particular application that is tailored for use with that case. For example, the camera case 500 may cause the device to initiate a camera application. In some cases, a user may be able to customize how a device behaves, such as what is presented on its graphical user interface, when it is used with different accessories. For example, the device 100 may allow the user to create multiple different auxiliary graphical user interfaces that each include desired interface components. The user can also associate the auxiliary graphical user interfaces with respective accessories. For example, the user can create one auxiliary graphical user interface that is activated (e.g., displayed instead of a primary graphical user interface) when the device is placed on a dock in a bedroom, and a second, different graphical user interface that is activated when the device is placed on a dock in a kitchen. In some cases, the user can create numerous different auxiliary graphical user interfaces for numerous different use cases and accessories.

Figure 6:
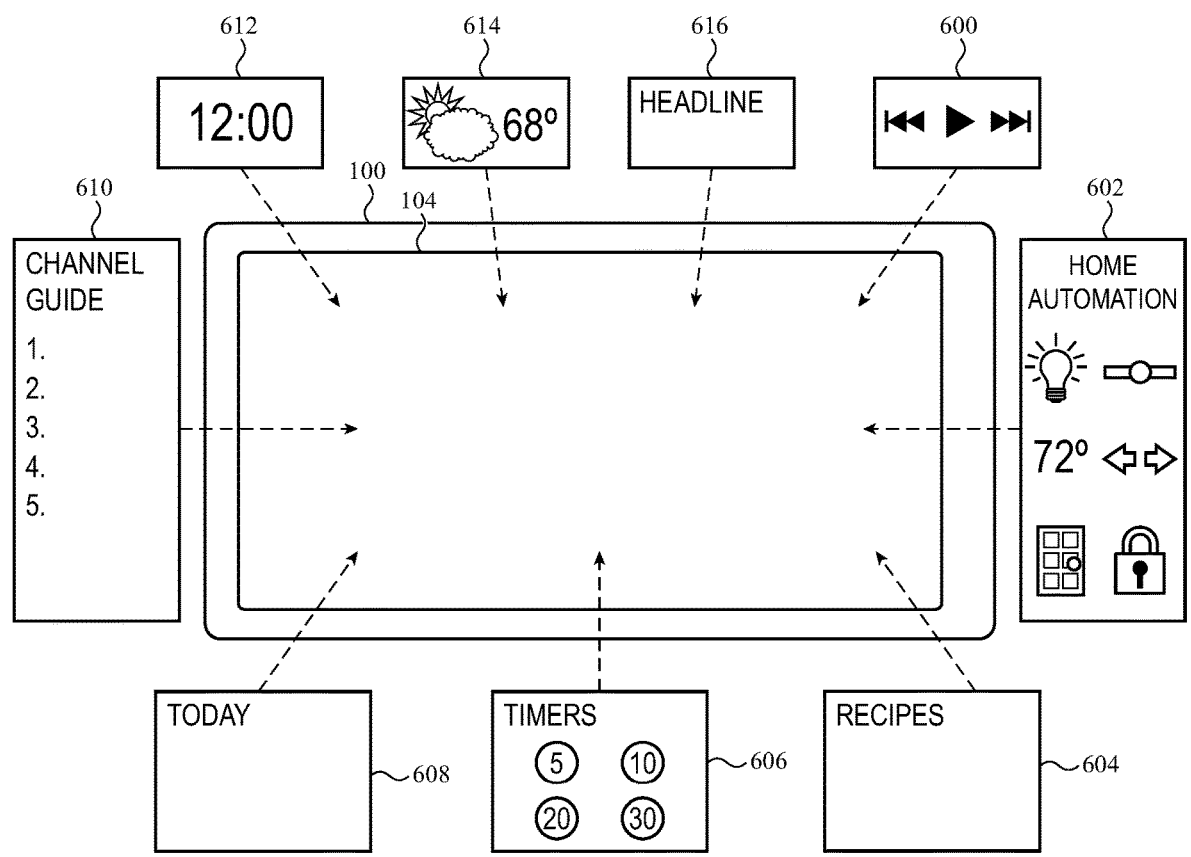
FIG. 6 depicts an example group of candidate graphical objects for creating user-defined auxiliary graphical user interfaces.

The auxiliary graphical user interfaces may be created by allowing a user to select from a group of candidate graphical objects. FIG. 6, for example, illustrates an example group of candidate graphical objects, including an audio control object 600, a home automation object 602, a recipe object 604, a timer object 606, a calendar object 608, a channel guide and selection object 610, a clock object 612, a weather object 614, and a news-feed object 616. In order to create an auxiliary graphical user interface, the user may select graphical objects from the group of candidate graphical objects, associate them with particular locations on the display 104 of the device 100 (e.g., defining a user-defined arrangement), and associate the auxiliary graphical user interface with a particular accessory. The graphical objects may have input objects, output objects, or both. Notably, the user may define numerous auxiliary graphical user interfaces each with different objects or different combinations of objects (or even with the same objects in a different user-defined arrangement). For example, one auxiliary graphical user interface may include the audio control object, while another may lack the audio control object. By providing such flexibility, users can produce highly customized and relevant auxiliary user interfaces for use with numerous different docks and accessories.

In some implementations, auxiliary graphical user interfaces are associated with specific docks or other accessories. For example, in some implementations, a user creates an auxiliary graphical user interface (e.g., by selecting a set of graphical objects from the candidate graphical objects), and associates the created auxiliary graphical user interface with a dock (e.g., by creating the auxiliary graphical user interface while the device is on the dock, by placing the device on the dock after creating the auxiliary graphical user interface, by manually associating the dock with the created auxiliary graphical user interface, or the like). Thereafter, when the device is placed on the dock, the user-created auxiliary graphical user interface is displayed. The same process may be used to create other customized auxiliary graphical user interfaces that are associated with other docks.

The audio control object 600 may include audio control input objects ("audio control inputs") for controlling audio playback functions of the device 100 or any other device that the device 100 can control. For example, the audio control inputs of the audio control object 600 may be configured to control audio of a network-connected audio system that the device 100 can control using network communications. The audio control object 600 may also have output objects, such as an indicator of the currently played or queued media, album art, or the like.

The home automation object 602 may include input objects that allow the user to control network-connected home automation systems, such as alarms, lighting, audio systems, HVAC systems, and the like. The home automation object 602 may also include output objects that indicate the state of interconnected systems, such as the lights, door sensors, window sensors, and the like. As noted above, in some implementations, a dock can be associated with a particular virtual room or environment in a home automation platform. Accordingly, when the device is placed on a dock associated with a particular virtual room or environment, the home automation object 602 may display controls for devices that are also associated with the particular room or environment. Thus, for example, a home automation object 602 that is displayed when the device is placed on a dock associated with and/or assigned to a "dining room" environment in the home automation platform can display controls for operating the lights of the dining room, while a home automation object 602 that is displayed when the device is placed on a dock associated with and/or assigned to a "living room" environment in the home automation platform can display controls for operating the lights in the living room, as well as a television and an audio system. Accordingly, the user need not manually select individual devices (e.g., a television, a set of lights, etc.) to associate with the home automation object (though in some cases, that is also an option). In some implementations, a home automation object in an auxiliary graphical user interface includes different controls based on the time of day. For example, a home automation object in an auxiliary graphical user interface for a bedroom dock may display, when the device is placed on the dock during the day, controls for an audio system, and, when the device is placed on the dock during the evening, controls for bedroom lights and a home alarm system.

The recipe object 604 may display cooking recipes or recipe lists. The recipe object 604 may also provide a search interface for searching for recipes. The timer object 606 may provide inputs for setting a timer and selecting timer settings (e.g., alert tones, volume, etc.), and may display timer progress. The calendar object 608 may show a snapshot of a user's calendar items. The channel guide and selection object 610 may display a list of channels, shows, show times, or other television program information. The channel guide and selection object 610 may also provide input objects for controlling a television, DVR, DVD player, or the like. The clock object 612 may display the current time. The weather object 614 may display current weather conditions and/or weather forecasts. The news-feed object 616 may display news headlines or articles.

The foregoing represents only some of the possible graphical objects that may be provided to a user to create auxiliary graphical user interfaces. In some cases, more, fewer, or additional graphical objects may be provided as well. The graphical objects may be associated with or use functions of other applications that are executed by the device 100. For example, a timer application (which may have its own separate graphical user interface) may provide timing functions for the timer object 606. In some cases, the functions of multiple different applications are included in a single graphical object. For example, the home automation graphical object 602 may use functions provided by a lighting application (on the device 100) to control lights, and functions of a separate thermostat application (on the device 100) to control the HVAC system.

Associating the auxiliary graphical user interface with a particular accessory may include associating the auxiliary graphical user interface with an identifier of a near-field wireless communication antenna of the accessory. For example, when a device is placed on or used with an accessory for the first time, the device may prompt the user to create an auxiliary graphical user interface for use with that accessory. The device may then store the association between the auxiliary graphical user interface and the accessory so that when the device detects the accessory in the future (e.g., using the near-field wireless communications described herein), the device will transition from displaying a first graphical user interface (e.g., whatever graphical user interface is active at that time) to displaying the auxiliary graphical user interface associated with that accessory.

In some cases, instead of an auxiliary graphical user interface that includes a set of user-selected graphical objects, a user may associate a particular accessory or dock with a particular application. For example, a device may include a dedicated application for a social network, a telephone, a video phone, a music player, or the like. The user may select any given application to be executed and/or initialized when the device is placed in a particular dock. Thus, as one example, the user may associate a video phone application with a dock that sits on the user's desk. Whenever the user places the device in that dock, the video phone application may be initialized (including, for example, causing the device to display the graphical user interface of the video phone application). In some cases, a phone or video phone application may be configured to initiate a call or an audio and/or video stream with another device in response to the device being placed in a particular dock. For example, when the user places the device in a dock at the user's work desk, a live video stream of the user's home security camera (or any other electronic device) may be displayed on the device. As another example, when the user places the device on a dock at the user's home desk, a video call with another person may be initiated. As described above, in some implementations, the particular application(s), control(s), and/or graphical object(s) that are executed and/or displayed in response to the device being placed on or used in conjunction with a dock or other accessory are based on an assignment of the dock or other accessory to a room in a home automation platform. Thus, for example, when a device detects that it is placed on a dock that is associated with or assigned to an "office" environment in a home automation platform, the device can execute an application or show controls that are also associated with the "office" environment. In some cases, multiple docks or accessories may be associated with the same room or environment in a home automation platform. In such cases, the different docks, even when associated with the same room or environment, may cause a device to execute or display different application(s), control(s), and/or graphical object(s). In some implementations, the particular application(s), control (s), and/or graphical object(s) that are displayed and/or executed are based on a property or type of dock (e.g., an alarm clock dock in a bedroom may cause alarm controls to be displayed, while a charging dock in the bedroom may cause lighting and audio controls to be displayed), or based on a user selection (e.g., a user can specify that a first bedroom dock will cause a first set of application(s), control(s), and/or graphical object(s) to be displayed and/or executed, and a second bedroom dock will cause a second set of application(s), control(s), and/or graphical object(s) to be displayed and/or executed).

In some cases, multiple individuals may configure their devices and docks to initiate a video call or video conference whenever two or more of the devices are placed on particular docks. For example, two users may configure their devices so that if one user places his or her device on a particular dock while the other user's device is also on a dock, a video call (e.g., a live or streaming video feed) is automatically initiated (e.g., without further user input). The video call may be terminated automatically upon either of the devices being removed from their respective docks. This may provide an easy and efficient way for family, friends, and coworkers to communicate with one another. While the foregoing example describes a two-person communication link, a similar technique may be used for more than two users. For example, a group of coworkers may each configure their device to initiate a video conference when their device is placed on a dock at their work place. In this way, they may be able to instantly collaborate with anyone else in their company or work group that is also available at that time. The user may simply remove their phone from the dock when they no longer need or want to communicate with that group. A user may even configure their device to join a different video conference when it is placed on a different dock. Accordingly, a user can communicate with different groups simply by moving their device to a different dock. While the foregoing examples are described primarily with respect to video conferences or video calls that are initiated by placing a device on a docking accessory, the same principles may be applied to audio-only communications (instead of video) and other types of accessories such as protective cases, charging docks, charging mats, vehicle-mounted docks or holders, or the like.

Figure 7:
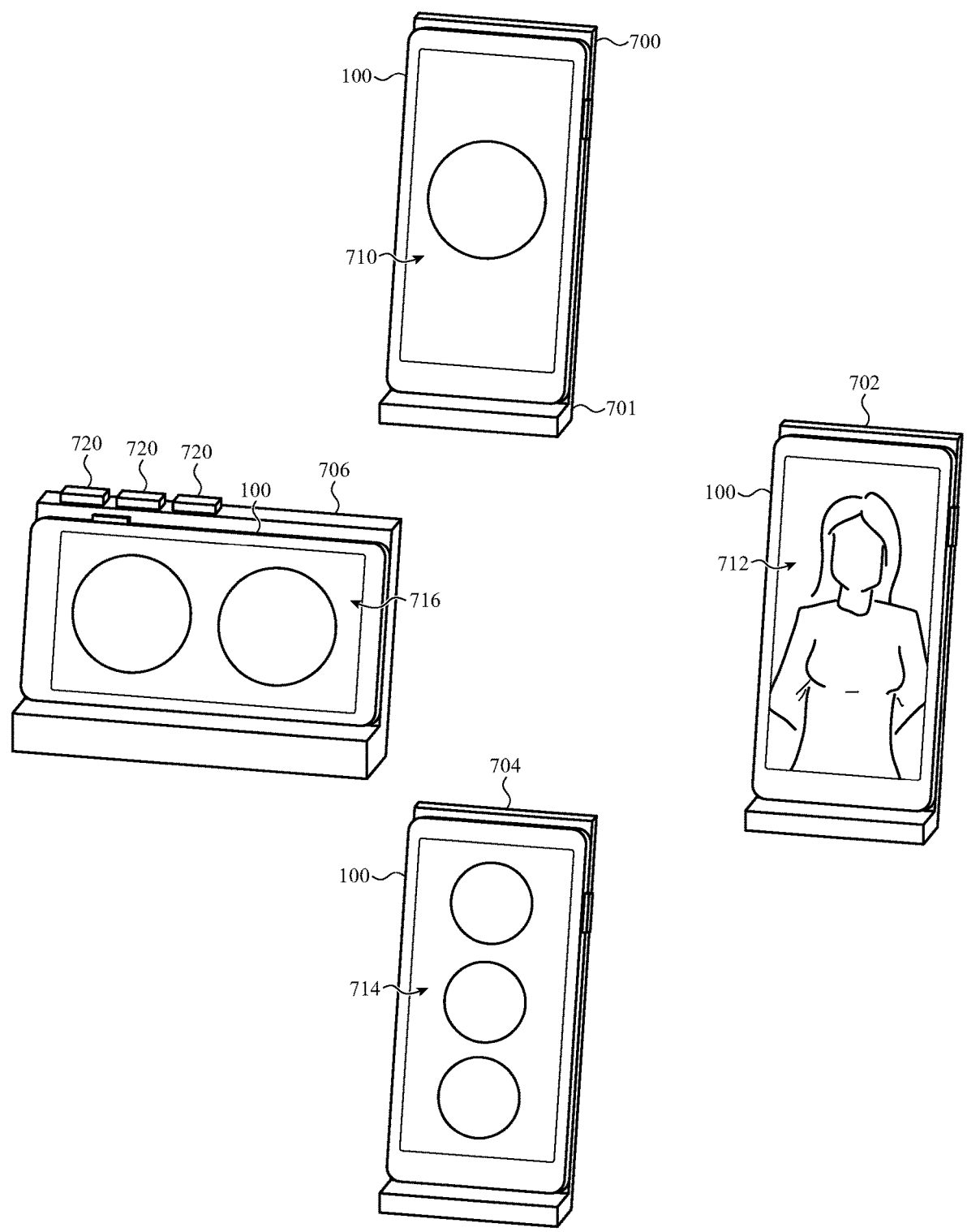
FIG. 7 depicts several example docks for the device of FIG. 1A.

FIG. 7 illustrates how various different auxiliary graphical user interfaces may be displayed on the device 100 based on what accessory or dock the device 100 is placed on. Each dock shown in FIG. 7 may include a near-field wireless communication antenna that allows the device 100 to detect when it has been placed on the support structure. Further, each dock may include a support structure that is configured to hold the device in a viewable orientation when the dock is on a surface of an object (e.g., structure 701 of the dock 700). The surface of an object may correspond, for example, to a surface of a table, counter, desk, nightstand, dresser, or any other suitable object. In this way the device can be viewed and interacted with, including allowing the user to touch the device to provide inputs (by pressing buttons, providing touch or stylus inputs on a touch sensitive surface, or the like). Further, the support structure may allow a user to simply place the device onto the support structure and remove it from the support structure (and consequently cause it to initiate a different operating mode and/or graphical user interface) without additional steps such as communicatively pairing the devices, mechanically securing the device to or in the dock, aligning and coupling electrical connectors, or the like.

Returning to FIG. 7, when the device 100 is placed on the first dock 700, the device 100 may detect, with its near-field wireless communication system, the antenna of the first dock 700 and thereby determine that it is in proximity to (e.g., placed on) the first dock 700. The device 100 may then determine what mode of operation it should operate in based on its proximity to the first dock 700 (e.g., what auxiliary graphical user interface to display) and begin operating in the mode of operation that corresponds to the first dock 700 (e.g., it may display the graphical user interface that has been associated with that dock). In the example shown in FIG. 7, the device 100 may display a first auxiliary graphical user interface 710, which may include a channel guide and selection object (e.g., allowing a user to view and select channels to view on a television) and a home automation object (e.g., allowing a user to control home automation systems such as lights, security systems, door locks, thermostats, etc.). These graphical objects which may have been selected by the user to be displayed when the device 100 is in this particular dock. For example, the first dock 700 may be located in a user's living room or recreation room where television channel selection and home automation controls are particularly useful to the user. Of course, because a user can customize the graphical user interface for any dock in any location, the contents of the first auxiliary graphical user interface 710 are merely examples and may be customized by a user to fit the user's particular needs for a particular dock location.

The first auxiliary graphical user interface 710 may be displayed when the device 100 is placed on the dock 700 regardless of what was displayed immediately prior. For example, if the device 100 is not displaying anything (e.g., the display 104 is blank), the display 104 may turn on and immediately display the first auxiliary graphical user interface 710. If the device 100 is currently displaying a primary graphical user interface (e.g., the primary graphical user interface 128, FIG. 1B), the device may cease displaying the primary graphical user interface and instead display the first auxiliary graphical user interface 710.

When the device 100 is placed in a second dock 702, the device 100 may detect, with its near-field wireless communication system, the antenna of the second dock 702 and thereby determine that it is in proximity to (e.g., placed on) the second dock 702. The device 100 may then determine what mode of operation it should operate in based on its proximity to the second dock 702 (e.g., what auxiliary graphical user interface to display) and begin operating in the mode of operation that corresponds to the second dock 702 (e.g., it may display the graphical user interface that has been associated with that dock). In the example shown in FIG. 7, the device 100 may display a second auxiliary graphical user interface 712, which may correspond to a live video stream captured by a remote electronic device and sent to the device 100. More particularly, when the device 100 is placed on the second dock 702, a live video link with another device may be automatically initiated. The live video link may be with another similar device (e.g., a mobile phone, tablet computer, laptop computer) that allows two-way audio and video communications, or with a camera such as a security camera or webcam. Accordingly, the second auxiliary graphical user interface 712 may correspond to a video feed from another camera. As another example, instead of automatically initiating the live video link, placing the device 100 on the second dock 702 may cause the device 100 to display a list of contacts that a user can select to initiate a live video or audio feed with the selected contact. The device 100 may also activate a microphone or voice recognition scheme to accept a spoken command (e.g., "call my mother"). As noted above, the second auxiliary graphical user interface 712 may be displayed when the device 100 is placed on the second dock 702 regardless of what was displayed on the device 100 immediately prior. For example, the device 100 may transition from a blank screen to the second auxiliary graphical user interface 712 or from another graphical user interface (e.g., a primary graphical user interface) to the second auxiliary graphical user interface 712.

When the device 100 is placed in a third dock 704, the device 100 may detect, with its near-field wireless communication system, the antenna of the third dock 704 and thereby determine that it is in proximity to (e.g., placed on) the third dock 704. The device 100 may then determine what mode of operation it should operate in based on its proximity to the third dock 704 (e.g., what auxiliary graphical user interface to display) and begin operating in the mode of operation that corresponds to the third dock 704 (e.g., it may display the graphical user interface that has been associated with that dock). In the example shown in FIG. 7, the device 100 may display a third auxiliary graphical user interface 714, which may include graphical objects relevant to a kitchen environment. For example, in some implementations, the third auxiliary graphical user interface 714 includes a recipe object that may allow a user to search for recipes, select from saved recipes, and read recipes. The third auxiliary graphical user interface 714 may also include a timer object, and/or a measurement conversion object.

Activation of the third auxiliary graphical user interface 714 may also configure the device to respond to spoken instructions (e.g., to scroll the recipe or change between recipes, to control the timers, etc.) so that the user does not need to touch to the device 100 to manipulate the user interface during cooking, which may be unsanitary and may damage the device 100. Further, an automatic display shutoff may be disabled so that the display (and thus the recipe, timers, etc.) do not disappear without warning. Of course, other user-selected graphical objects may be used instead of or in addition to those shown in the third auxiliary graphical user interface 714.

In some cases, docks that include support structures to hold the device in a viewable orientation may also include input systems that are configured to wirelessly communicate with the device in response to the input system being actuated by a user when the electronic device is positioned on the support structure. For example, FIG. 7 shows an example alarm clock dock 706 that includes input systems such as buttons 720. The buttons 720 may be similar to those described with respect to FIG. 5. For example, actuation signals from the buttons 720 may be detected by the device 100 in various ways. In some cases, the buttons 720 use near-field wireless communication techniques to provide inputs to the device 100. For example, the buttons 720 (or any other type of input system) may include an actuation member configured to be actuated by a user, as well as a passive antenna, such as a near-field wireless communication antenna. When the actuation member is actuated by the user (e.g., pressed), the buttons 720 may cause the near-field wireless communication antenna to become detectable by the electronic device. For example, when the buttons 720 are in an unactuated state, the near-field wireless communication antenna may be in a state or configuration that is not detectable by the device 100. This may be caused by the antenna being electrically decoupled from other circuit elements, grounded, electrically coupled to other circuit elements, or otherwise put into a state where the near-field wireless communication system of the device 100 does not detect the antenna. In response to the actuation member being actuated by the user, the passive antenna may become detectable by the electronic device. (Other techniques may be used to wirelessly communicate actuation signals from the buttons 502 to the device 100, such as other wireless communication protocols (e.g., Bluetooth, WIFI), acoustic signals (e.g., audible, ultrasonic), light, or the like.)

As with the other docks shown in FIG. 7, placing the device 100 on the dock 706 may cause the device 100 to display a fourth auxiliary graphical user interface 716. In some implementations, the fourth auxiliary graphical user interface 716 includes clock and/or alarm clock graphical objects. Accordingly, the dock 706 may be suited for placement in a user's bedroom. The buttons 720 may be configured to control or change settings of the clock and/or alarm clock graphical objects, such as setting alarm times, snoozing an alarm, changing the display brightness (e.g., temporarily activating the display so that a user can see the time during the night), or the like. This may improve the experience of using the alarm functions of the device 100 by eliminating the need for a user to look at the display of the device to locate a touch-sensitive snooze button or otherwise control alarm functions.

In addition to transitioning to the fourth auxiliary graphical user interface 716 in response to being placed on the dock 706, the device 100 may also change other device settings. For example, where the dock 706 is in a bedroom and being used as an alarm clock, the device may also change notification settings (e.g., turning off audible, visible, and/or tactile notifications of messages, events, etc.), change display settings (e.g., display brightness, display color content, etc.). Other device customizations are also possible upon the device 100 detecting that it is on the dock 706.

While FIG. 7 shows several example docks and associated auxiliary user interfaces, other types of docks are also possible, including docks having different form factors, different targeted uses and/or locations, different arrangements and types of auxiliary input systems, and the like. For example, a dock may include speakers (like the dock 118, FIG. 1A) and may cause the device 100 to transition to an auxiliary graphical user interface that includes music or audio-control objects. As another example, a dock without speakers may cause the device 100 to transition to an auxiliary graphical user interface that includes music or audio-control objects and also configures the device to control or connect with a wireless speaker system.

Another example dock may cause the device 100 to transition to an auxiliary graphical user interface that is configured as a shared family device. This may include displaying a shared (e.g., among a family) calendar, task list, reminder list, or the like, as well as objects for controlling home functions such as security systems, a thermostat, lighting, music, or the like. In some implementations, shared information (e.g., among a family) corresponds to information that is shared between accounts that are linked to a shared family account and share access to information and/or content (e.g., a calendar, photos, contacts, etc.) and/or payment methods. In addition to transitioning to the auxiliary graphical user interface, the device may also change device settings by restricting access to a single user's personal content (e.g., messaging applications and functions, etc.), changing notification settings (e.g., turning off notifications or removing visible message previews), and the like.

Another example dock may cause the device 100 to transition to an auxiliary graphical user interface that is configured as a voice-based digital assistant interface. This may include dynamically displaying transcriptions of voice input, displaying content or graphical objects related to voice-based commands issued to the device 100, or the like. A dock configured to customize the device for use as a digital assistant may also include microphones and/or speakers that can communicate with the device 100 to enhance the device's audio capabilities.

Another example dock may cause the device 100 to transition to an auxiliary graphical user interface that is configured to control an appliance that is wirelessly coupled to the device 100 or otherwise configured to receive and/or respond to commands from the device 100. For example, an auxiliary graphical user interface for controlling a washing machine may include control objects tailored to the washing machine's functions (e.g., water temperature, spin cycle level, cycle time, soil level). As another example, a user interface that is configured to control a coffee maker may include control objects tailored to the coffee maker's functions (e.g., brew start time, coffee strength, grind size, water temperature). Of course, auxiliary user interfaces may be tailored for use with other appliances and devices as well.

Docks may also be provided at public places, businesses, or other locations where they may be used by many different users. Such docks may cause devices to transition to auxiliary graphical user interfaces that are relevant to their locations and/or environments. For example, a restaurant may provide docks at their tables that cause devices to display a menu and/or ordering interface when the devices are placed on the docks. As another example, an airport may have docks at each gate that cause devices to display flight information for that gate. As another example, parks may have docks at points of interest that cause devices to display information or interactive applications related to those points of interest. Shared docks such as those described above (and indeed any dock described herein) may also include wireless charging systems as described above with respect to FIGS. 2A-2B.

As described above, auxiliary user interfaces may be customized by a user and associated with a particular dock. In some cases, docks may be configured to trigger a pre-populated auxiliary graphical user interface. For example, a dock may be sold as a "kitchen" dock, and the dock and/or devices that are usable with the dock may be configured to trigger an auxiliary graphical user interface that includes a recipe object and a timer object. The user may use the default auxiliary graphical user interface, or modify and/or change the auxiliary graphical user interface in any manner (e.g., with different cooking or kitchen-relevant objects, or so that the dock can be used in an entirely different context such as on the user's nightstand). Other types of "default" docks may also be provided and may trigger similarly tailored auxiliary graphical user interfaces. For example, a "bedroom" dock may, by default, trigger an interface with an alarm clock object, and a "living room" dock may, by default, trigger a television control object. Of course, these default auxiliary graphical user interfaces may be replaced or modified by the user using the modular user interface scheme described herein.

While the docks, cases, and other accessories described herein may cause the device to transition from one mode of operation to another (including, for example, transitioning from one graphical user interface to another, different graphical user interface), users may be able to selectively return to a previous or a different mode of operation (and associated graphical user interface) while the device is still associated with an accessory. For example, when a device is placed on kitchen dock, thus triggering the transition to a cooking-based user interface, the user may control the device to leave the cooking-based user interface and instead return to a primary graphical user interface while the device remains on the dock. As another example, the user may control the device to leave the cooking-based user interface and instead initiate a music-playback interface. A user may also be able to select whether or not a particular graphical user interface may be freely changed. For example, if a user places a device in a child-proof case, they may not want the child to be able to freely return to the primary user interface. Accordingly, users may be able to select what auxiliary graphical user interfaces (if any) may be freely available once a device is used with a particular accessory. A password or other authentication may be required in order to transition between auxiliary user interfaces.

In some cases, the device 100 transitions from an auxiliary graphical user interface to a primary graphical user interface when the device 100 is removed from a dock. For example, the near-field wireless communication system of the device 100 may determine that the device is no longer in proximity to the dock based on ceasing to detect the near-field wireless antenna of the dock. Upon ceasing to detect the near-field wireless antenna of the dock, the device 100 may cease displaying the auxiliary graphical user interface (or any other graphical user interface associated with that dock) and begin displaying the primary graphical user interface.

Figure 8:
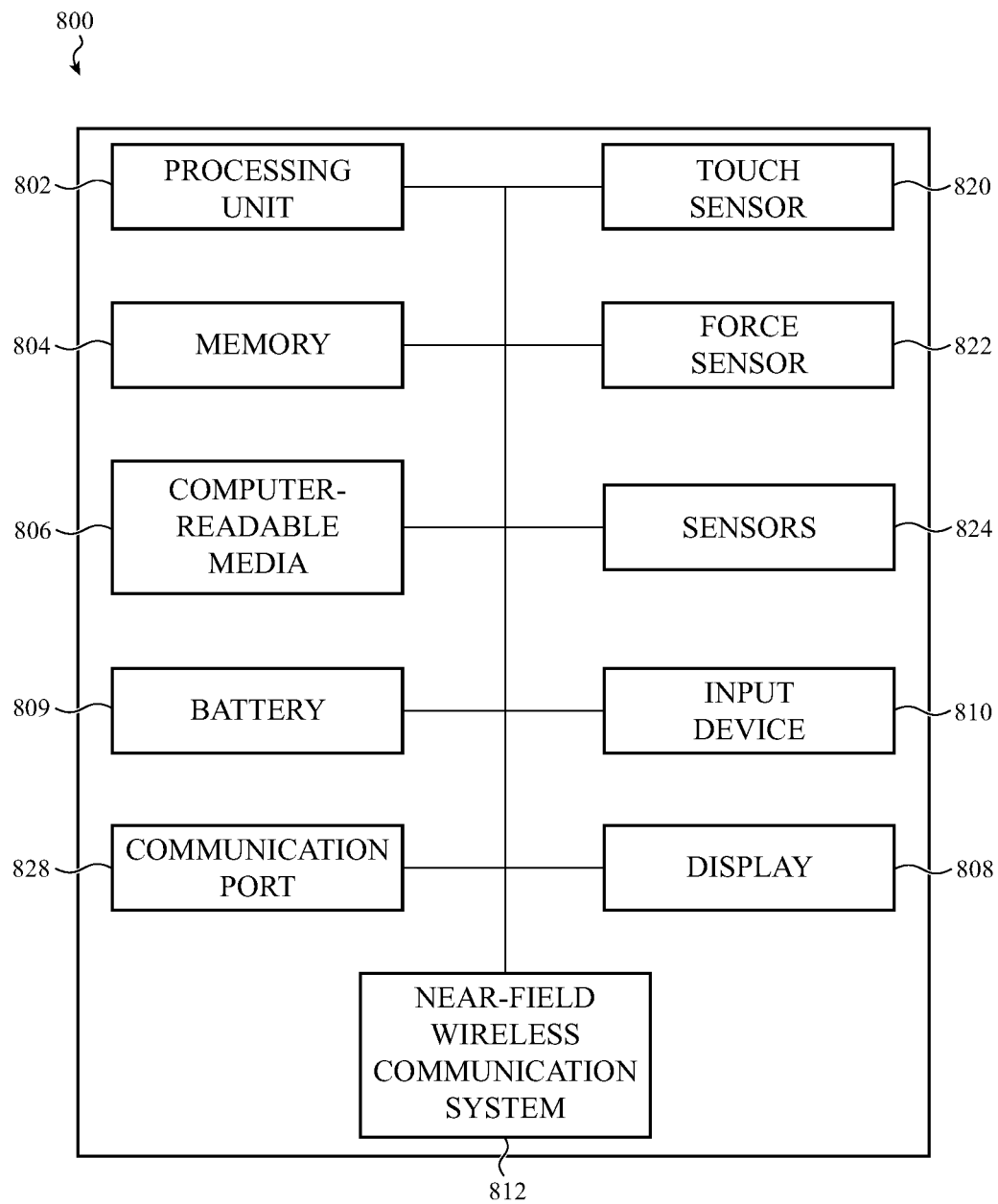
FIG. 8 depicts example components of an electronic device.

FIG. 8 depicts an example schematic diagram of an electronic device 800. By way of example, the device 800 of FIG. 8 may correspond to the electronic device 100 shown in FIGS. 1A-7 (or any other electronic device described herein). To the extent that multiple functionalities, operations, and structures are disclosed as being part of, incorporated into, or performed by the device 800, it should be understood that various embodiments may omit any or all such described functionalities, operations, and structures. Thus, different embodiments of the device 800 may have some, none, or all of the various capabilities, apparatuses, physical features, modes, and operational parameters discussed herein. Further, details of the electronic device 100 that are shown and/or described herein will be understood to apply equally to the electronic device 800. For example, device components (e.g., attachment mechanisms, housings, antennas, etc.), application software, graphical user interfaces, etc., may all be embodied by the device 800. Further, any of the components, hardware, software, or other systems or components described with respect to the electronic device 800 may equally be included in the electronic device 100.

As shown in FIG. 8, a device 800 includes a processing unit 802 operatively connected to computer memory 804 and/or computer-readable media 806. The processing unit 802 may be operatively connected to the memory 804 and computer-readable media 806 components via an electronic bus or bridge. The processing unit 802 may include one or more computer processors or microcontrollers that are configured to perform operations in response to computer-readable instructions. The processing unit 802 may include the central processing unit (CPU) of the device. Additionally or alternatively, the processing unit 802 may include other processors within the device including application specific integrated chips (ASIC) and other microcontroller devices.

The memory 804 may include a variety of types of non-transitory computer-readable storage media, including, for example, read access memory (RAM), read-only memory (ROM), erasable programmable memory (e.g., EPROM and EEPROM), or flash memory. The memory 804 is configured to store computer-readable instructions, sensor values, and other persistent software elements. Computer-readable media 806 also includes a variety of types of non-transitory computer-readable storage media including, for example, a hard-drive storage device, a solid-state storage device, a portable magnetic storage device, or other similar device. The computer-readable media 806 may also be configured to store computer-readable instructions, sensor values, and other persistent software elements.

In this example, the processing unit 802 is operable to read computer-readable instructions stored on the memory 804 and/or computer-readable media 806. The computer-readable instructions may be provided as a computer-program product, software application, or the like.

As shown in FIG. 8, the device 800 also includes a display 808. The display 808 may include a liquid-crystal display (LCD), organic light emitting diode (OLED) display, light emitting diode (LED) display, or the like. If the display 808 is an LCD, the display 808 may also include a backlight component that can be controlled to provide variable levels of display brightness. If the display 808 is an OLED or LED type display, the brightness of the display 808 may be controlled by modifying the electrical signals that are provided to display elements. The display 808 may correspond to any of the displays shown or described herein, such as the display 104 (FIG. 1A).

The device 800 may also include a battery 809 that is configured to provide electrical power to the components of the device 800. The battery 809 may include one or more power storage cells that are linked together to provide an internal supply of electrical power. The battery 809 may be operatively coupled to power management circuitry that is configured to provide appropriate voltage and power levels for individual components or groups of components within the device 800. The battery 809, via power management circuitry, may be configured to receive power from an external source, such as an AC power outlet, a charging dock (e.g., the wireless charging dock 200, FIGS. 2A-2B), an auxiliary battery, a battery-enabled protective case, or the like. The battery 809 may store received power so that the device 800 may operate without connection to an external power source for an extended period of time, which may range from several hours to several days. Power management circuitry may include wireless charging components, such as a charging coil that inductively couples to an output coil of a wireless charger to charge the battery 809.

In some embodiments, the device 800 includes one or more input devices 810. An input device 810 is a device that is configured to receive user input. The one or more input devices 810 may include, for example, a rotatable input system, a push button, a touch-activated button, a keyboard, a key pad, or the like (including any combination of these or other components). In some embodiments, the input device 810 may provide a dedicated or primary function, including, for example, a power button, volume buttons, home buttons, scroll wheels, and camera buttons.

The device 800 may also include a sensor 824. The sensor 824 may detect inputs provided by a user to one or more of the input devices 810 of the device 800. The sensor 824 may also be a biometric sensor, such as a heart rate sensor, electrocardiograph sensor, temperature sensor, or any other type of sensor. In cases where the sensor 824 is a biometric sensor, it may include biometric sensing circuitry, as well as portions of a crown that conductively couple a user's body to the biometric sensing circuitry. Biometric sensing circuitry may include components such as processors, capacitors, inductors, transistors, analog-to-digital converters, or the like.

The device 800 may also include a touch sensor 820 that is configured to determine a location of a touch on a touch-sensitive surface of the device 800 (e.g., an input surface defined by the transparent cover 105). The touch sensor 820 may use or include capacitive sensors, resistive sensors, surface acoustic wave sensors, piezoelectric sensors, strain gauges, or the like. In some cases the touch sensor 820 associated with a touch-sensitive surface of the device 800 may include a capacitive array of electrodes or nodes that operate in accordance with a mutual-capacitance or self-capacitance scheme. The touch sensor 820 may be integrated with one or more layers of a display stack (e.g., the display 104, FIG. 1A) to provide the touch-sensing functionality of a touchscreen.

The device 800 may also include a force sensor 822 that is configured to receive and/or detect force inputs applied to a user input surface of the device 800 (e.g., a surface of the transparent cover 105). The force sensor 822 may use or include capacitive sensors, resistive sensors, surface acoustic wave sensors, piezoelectric sensors, strain gauges, or the like. In some cases, the force sensor 822 may include or be coupled to capacitive sensing elements that facilitate the detection of changes in relative positions of the components of the force sensor (e.g., deflections caused by a force input). The force sensor 822 may be integrated with one or more layers of a display stack (e.g., the display 104) to provide force-sensing functionality of a touchscreen.

The device 800 may also include a communication port 828 that is configured to transmit and/or receive signals or electrical communication from an external or separate device. The communication port 828 may be configured to couple to an external device via a cable, adaptor, or other type of electrical connector. In some embodiments, the communication port 828 may be used to couple the device 800 to an accessory, including a dock or case, a stylus or other input device, smart cover, smart stand, keyboard, or other device configured to send and/or receive electrical signals.

The device 800 may also include a near-field wireless communication system 812 (which may correspond to the near-field wireless communication system 106 in FIG. 1A). The near-field wireless communication system may include one or more antennas and associated circuitry for detecting the presence of near-field wireless communication antennas. The near-field wireless communication system 812 may be configured to operate using any suitable type or protocol of near-field wireless communications, including but not limited to near-field communications ("NFC") protocols, radio frequency identification ("RFID") protocols, or any other suitable type or protocol. The near-field wireless communication system 812 may be configured to detect near-field wireless communication antennas through a single side of the device (e.g., the back side), or multiple sides (e.g., any combination of sides including all sides).

While the device 800 is described as having a particular set of components, the device 800 is not limited to only those components described herein. For example, a device may include more than one of the components described with respect to FIG. 8 or elsewhere in the instant application, and may indeed include other components not described herein.

The foregoing description shows and describes various types of graphical objects that may be displayed by a device in response to the device detecting that it is being used with a near-field wireless enabled accessory. The graphical objects may take the form of or include icons, graphical user interfaces, background images, notification object (e.g., for temporary notifications), or the like. The graphical objects may be programmatically associated with any suitable application, program, or operating system of the device, and/or may originate from any suitable layer of the Open Systems Interconnection model (OSI model). For example, in cases where the device detects an accessory and in response temporarily displays a notification object over a part of a primary graphical user interface of an operating system, the notification object may be programmatically associated with or originate from the operating system. As another example, in cases where the device detects an accessory and in response initiates an application, the graphical user interface of the application may be programmatically associated with or originate from the application (where an application may be defined as a software program that is executed by or on the operating system).

As described above, one aspect of the present technology is the gathering and use of data available from various sources to improve the usefulness of the devices described herein. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to the benefit of users. For example, the personal information data can be used to provide customized graphical user interfaces and user experiences. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. A system comprising:
   a mobile phone comprising:
      an enclosure; and
      a display positioned at least partially within the enclosure; and
   an accessory configured to be removably coupled to the mobile phone and comprising:
      a magnetic attachment system configured to magnetically couple the accessory to a back of the mobile phone; and
      a near-field wireless communication antenna detectable by the mobile phone, wherein the mobile phone is configured to:
   detect the near-field wireless communication antenna when the accessory is magnetically coupled to the back of the mobile phone;
   in response to detecting the near-field wireless communication antenna, switch from displaying a first graphical output to displaying a second graphical output; and
   while the accessory is magnetically coupled to the back of the mobile phone, switch from displaying the second graphical output to displaying the first graphical output.

2. The system of claim 1, wherein:
   the magnetic attachment system is a first magnetic attachment system;
   the accessory comprises:
      a first wireless charging system comprising an output coil; and
      a first battery configured to provide power to the output coil; and
   the mobile phone comprises:
      a second magnetic attachment system configured to magnetically couple to the first magnetic attachment system of the accessory;
      a second battery; and
      a second wireless charging system comprising a charging coil configured to inductively couple with the output coil to charge the second battery of the mobile phone.

3. The system of claim 2, wherein the second graphical output includes a graphical object including a charge level of the second battery.

4. The system of claim 3, wherein the graphical object includes a battery charge level of the first battery.

5. The system of claim 1, wherein:
   the system further comprises a protective case comprising a shell defining a cavity and configured to at least partially cover the enclosure of the mobile phone when the mobile phone is positioned in the cavity; and
   the accessory is further configured to magnetically couple to a back surface of the shell.

6. The system of claim 1, wherein:
   the first graphical output includes a background image; and
   the second graphical output includes a graphical object displayed over the background image.

7. The system of claim 1, wherein:
   the accessory is a charging accessory; and
   the system further comprises a second accessory configured to magnetically couple to the back of the mobile phone.

8. A portable electronic device comprising:
   an enclosure;
   a display; and
   a near-field wireless communication system configured to detect attachment of each removable accessory of a set of removable accessories to a back of the portable electronic device, wherein:
   in accordance with the near-field wireless communication system detecting that a first removable accessory of the set of removable accessories is coupled to the back of the portable electronic device, the portable electronic device transitions from displaying a first graphical output to a second graphical output; and
   when the near-field wireless communication system detects that a second removable accessory of the set of removable accessories is coupled to the back of the portable electronic device, the portable electronic device transitions from displaying the first graphical output to a third graphical output different from the second graphical output.

9. The portable electronic device of claim 8, wherein the first removable accessory is a wallet accessory.

10. The portable electronic device of claim 9, wherein:
    the near-field wireless communication system is configured to detect a removal of a payment card from the wallet accessory; and
    in accordance with the near-field wireless communication system detecting the removal of the payment card, the portable electronic device transitions from the first graphical output to a fourth graphical output.

11. The portable electronic device of claim 8, wherein the second removable accessory is a charging accessory comprising:
    a first battery; and
    a wireless charging system coupled to the first battery and configured to charge a second battery of the portable electronic device through the back of the portable electronic device.

12. The portable electronic device of claim 8, wherein, in accordance with the near-field wireless communication system detecting that the first removable accessory has decoupled from the back of the portable electronic device, the portable electronic device transitions from displaying the first graphical output to a fourth graphical output.

13. The portable electronic device of claim 12, wherein the fourth graphical output indicates a location of the portable electronic device when the first removable accessory was decoupled from the back of the portable electronic device.

14. The portable electronic device of claim 8, wherein the portable electronic device is configured to log a location of the portable electronic device in response to detecting, with the near-field wireless communication system, that the first removable accessory has decoupled from the back of the portable electronic device.

15. A mobile phone comprising:

an enclosure comprising a transparent cover;

a display positioned below the transparent cover;

a touch sensor positioned below the transparent cover and configured to detect a touch input applied to the transparent cover;

a magnetic attachment system configured to magnetically couple an accessory to the mobile phone; and a near-field wireless communication system configured to detect an attachment of the accessory to the mobile phone and a detachment of the accessory from the mobile phone, wherein:

in response to the near-field wireless communication system detecting the attachment of the accessory to the mobile phone, the mobile phone transitions from displaying a first graphical output to a second graphical output; and in response to the near-field wireless communication system detecting the detachment of the accessory from the mobile phone, the mobile phone transitions from displaying the first graphical output to a third graphical output different from the second graphical output.

16. The mobile phone of claim 15, wherein:

the accessory is a wallet accessory; and the third graphical output indicates a location of the mobile phone when the wallet accessory was detached from the mobile phone.

17. The mobile phone of claim 15, wherein, in response to the near-field wireless communication system detecting the detachment of the accessory from the mobile phone, the mobile phone logs a location of the mobile phone when the accessory was decoupled from the mobile phone.

18. The mobile phone of claim 17, wherein, in response to the near-field wireless communication system detecting the detachment of the accessory from the mobile phone, the mobile phone logs a time when the accessory was decoupled from the mobile phone.

19. The mobile phone of claim 15, wherein the magnetic attachment system includes an array of magnets configured to align the accessory in a target orientation relative to the mobile phone.

20. The mobile phone of claim 15, wherein:

the accessory is a first accessory of a set of accessories;

the magnetic attachment system is further configured to magnetically couple a second accessory to the mobile phone;

the near-field wireless communication system is configured to detect an attachment of the second accessory to the mobile phone; and in response to the near-field wireless communication system detecting the attachment of the second accessory to the mobile phone, the mobile phone transitions from displaying the first graphical output to a fourth graphical output.

* * * * *